(12) United States Patent
Stojadinovic et al.

(10) Patent No.: US 11,035,046 B2
(45) Date of Patent: Jun. 15, 2021

(54) WOVEN OR NONWOVEN WEB

(71) Applicant: Jelena Stojadinovic, Bochum (DE)

(72) Inventors: Jelena Stojadinovic, Bochum (DE);
Fabio La Mantia, Bremen (DE)

(73) Assignee: Jelena Stojadinovic, Bochum (DE)

( * ) Notice: Subject to any disclaimer, the term of this patent is extended or adjusted under 35 U.S.C. 154(b) by 3 days.

(21) Appl. No.: 15/564,673

(22) PCT Filed: Apr. 7, 2016

(86) PCT No.: PCT/EP2016/057615
§ 371 (c)(1),
(2) Date: Oct. 5, 2017

(87) PCT Pub. No.: WO2016/162417
PCT Pub. Date: Oct. 13, 2016

(65) Prior Publication Data
US 2018/0080131 A1   Mar. 22, 2018

(30) Foreign Application Priority Data
Apr. 8, 2015 (DE) .......................... 102015004528.8

(51) Int. Cl.
*C25B 13/08* (2006.01)
*C25B 9/08* (2006.01)
(Continued)

(52) U.S. Cl.
CPC .............. *C25B 13/08* (2013.01); *C25B 1/04* (2013.01); *C25B 9/05* (2021.01); *C25B 9/19* (2021.01);
(Continued)

(58) Field of Classification Search
CPC .......... C25B 13/08; C25B 13/02; C25B 1/10; C25B 9/08; C25B 13/04; C25B 9/05; C25B 9/19; C25B 9/73; Y02E 60/36
See application file for complete search history.

(56) References Cited

U.S. PATENT DOCUMENTS 4,010,818 A * 3/1977 Westley ............... G10K 11/165
442/120
4,324,831 A * 4/1982 Parrini ................. G10K 11/165
442/120

(Continued)

FOREIGN PATENT DOCUMENTS

CA   2023691 A1   8/1990
EP   1 975 947 B1  10/2010
(Continued)

OTHER PUBLICATIONS

Kieffer et al., "Precipitation of barium sulphate in a hollow fiber membrane contractor: Part II The influence of process parameters," Chemical Engineering Science, 64 (2009) 1885-1891 (Year: 2009).*

(Continued)

*Primary Examiner* — Jeremy R Pierce
(74) *Attorney, Agent, or Firm* — Patterson Thuente Pedersen, P.A.

(57) ABSTRACT

The present invention relates to a woven or nonwoven web comprising:
fibers comprising one or more polymers selected from the group consisting of polyarylene sulfides, polyolefins, polyamide imides, polysulfones, polyethersulfones, polyetherketones, polyether etherketones or copolymers thereof; and
one or more inorganic salts selected from the group consisting of barium sulfate, strontium sulfate, calcium sulfate, lead(II) sulfate or mixtures thereof;

(Continued)

a)

b)

wherein the one or more inorganic salts are present on the surface of at least part of the fibers.
The woven or nonwoven web is particularly suitable for use in alkaline water electrolysis.

22 Claims, 19 Drawing Sheets

(51) Int. Cl.
    *C25B 13/04*     (2021.01)
    *C25B 1/04*     (2021.01)
    *C25B 9/05*     (2021.01)
    *C25B 9/19*     (2021.01)
    *C25B 9/73*     (2021.01)
    *C25B 13/02*     (2006.01)

(52) U.S. Cl.
    CPC ............... *C25B 9/73* (2021.01); *C25B 13/02* (2013.01); *C25B 13/04* (2013.01); *Y02E 60/36* (2013.01)

(56) References Cited

U.S. PATENT DOCUMENTS

| | | | | |
|---|---|---|---|---|
| 4,367,259 A * | 1/1983 | Fulmer | ................. | C08G 18/10 442/120 |
| 4,680,101 A | 7/1987 | Darlington | | |
| 2007/0178784 A1 * | 8/2007 | Jones | ...................... | B32B 27/12 442/398 |
| 2009/0000007 A1 * | 1/2009 | DeMeo | .............. | A41D 13/1209 442/62 |
| 2009/0326114 A1 * | 12/2009 | Grothe | ..................... | C08K 3/30 524/148 |
| 2010/0151311 A1 | 6/2010 | Usami et al. | | |
| 2012/0178332 A1 * | 7/2012 | Uchida | ................... | C08L 63/00 442/351 |
| 2013/0017431 A1 * | 1/2013 | Frisk | ................... | H01M 2/1606 429/145 |
| 2013/0273799 A1 * | 10/2013 | Luo | ........................ | C08G 75/14 442/181 |
| 2014/0091760 A1 * | 4/2014 | Miyazaki | ................ | H01M 2/16 320/109 |

FOREIGN PATENT DOCUMENTS

| | | |
|---|---|---|
| EP | 2 485 295 A1 | 8/2012 |
| EP | 2 835 843 A1 | 2/2015 |
| JP | S5026798 | 3/1975 |
| JP | 2002532634 | 10/2000 |
| WO | WO2000034957 | 6/2000 |

OTHER PUBLICATIONS

International Search Report and Written Opinion for International Application No. PCT/EP2016/057615, dated Jul. 6, 2016 (11 pgs).
German Office Action for Application No. 10 2015 004 528.8, dated Jan. 11, 2016 (7 pgs) and Machine Translation (6 pgs) (13 pgs).
Japanese Office Action for Japanese Application No. 2018-503710 dated Dec. 3, 2019. English translation provided.

* cited by examiner a)

b)

a)

b)

a)

b)

WOVEN OR NONWOVEN WEB

RELATED APPLICATIONS

This application is a national stage filing under 35 U.S.C. § 371 of International Application No. PCT/EP2016/057615, filed Apr. 7, 2016, which claims priority under 35 U.S.C. § 119 to German Application No. 102015004528.8, filed Apr. 8, 2015, the disclosures of which are each incorporated herein by reference in their entirety.

FIELD OF THE INVENTION

The present invention relates to a woven or nonwoven web comprising one or more polymers and one or more inorganic salts. The invention further relates to a method of preparing the woven or nonwoven web, the use of the woven or nonwoven web in alkaline water electrolysis, an electrolytic cell comprising the woven or nonwoven web and to a method of conducting alkaline water electrolysis using the woven or nonwoven web.

BACKGROUND OF THE INVENTION

Each cell of an alkaline water electrolyzer typically consists of a cathodic compartment including the cathode and an anodic compartment including the anode. A separator is installed in-between compartments which is filled with an electrolyte such as potassium hydroxide (KOH) or sodium hydroxide (NaOH).

In alkaline water electrolysis, hydrogen ($H_2$) is produced at the cathode:

$$2H_2O + 2e^- \rightarrow H_2 + 2OH^-.$$

At the anode, oxygen ($O_2$) is formed:

$$2OH^- \rightarrow \tfrac{1}{2}O_2 + H_2O + 2e^-.$$

The overall reaction taking place during alkaline water electrolysis is a sum of the partial reactions:

$$H_2O \rightarrow H_2 + \tfrac{1}{2}O_2.$$

The function of the gas separator is to prevent gas exchange between the compartments on the one hand and to enable permeation of the hydroxide ions ($OH^-$) from the hydrogen compartment to the oxygen compartment on the other hand. The separator should minimize the gas crossover to avoid contamination of the products hydrogen and oxygen (contamination of hydrogen by oxygen and vice versa) which are generated during electrolysis and might otherwise form explosive mixtures.

The zero gap principle of the industrial electrolyzers describes set-ups in which an electrode is in direct contact with a separating membrane or diaphragm. Thereby, the internal electrical resistance may be minimized as compared to traditional electrolyzers where there is a gap between the electrode and the separator. Besides zero-gap electrolyzers, non-zero gap designs are also in use. Industrial electrolyzers may operate at atmospheric or elevated pressures i.e. from 1 to about 120 bar depending on the design thereof.

In the field of pressurized alkaline water electrolyzers, state of the art separators comprise asbestos based separators, ceramic based separators (Zirfon Perl®) and separators based on nickel oxide (NiO). These types feature a porous structure with pore sizes within the nanometer range.

Asbestos based diaphragms have shown good mechanical and chemical stability, ionic conductivity, and wettability which makes them also suitable for use in zero gap alkaline water electrolyzers. However, the contact with asbestos and nickel oxide separators has been identified as a serious health hazard. In order to protect human health and to solve disposal issues related to asbestos diaphragms used in water electrolyzers, the European Commission banned the marketing and use of asbestos and related products in 2005. In addition to the health related issues, the efficiency of alkaline water electrolyzers with asbestos diaphragms is limited due to the instability of asbestos in caustic environments at temperatures above 90° C. (cf. non-patent documents 1 and 2).

In order to minimize the overpotential of electrolyzer cells, it would be preferable if higher operation temperatures were possible. So far, NiO based diaphragms and Zirfon Perl® have been considered as suitable alternatives for asbestos, taking into account their efficiency and stability at temperatures higher than 90° C. Nevertheless, drawbacks of NiO diaphragms are low cost effectiveness, short lifetime, and toxicity related issues (cf. non-patent documents 3 to 7). Regarding Zirfon Perl® membranes, besides their insufficient thickness for installation in some zero gap alkaline water electrolyzers, other shortcomings are low ionic conductivity and gas purity issues reported for their use in high pressure alkaline electrolyzers (cf. non-patent documents 8 to 10). The thickness of Zirfon Perl® membranes is typically 0.5 mm, because larger thicknesses would lead to a drop in process efficiency due to the poor ionic conductivity which significantly increases the voltage drop over the membrane and increases the electricity consumption during electrolysis.

As an alternative, sulfonated tetrafluoroethylene, which is sold under the Tradename Nafion®, has been considered as a suitable material for high-temperature alkaline water electrolysis, possibly up to operating temperatures of 250° C. (cf. non-patent document 11). However, conductivity of sulfonated tetrafluoroethylene is strongly affected by its water content. Therefore, when using solutions having a high potassium hydroxide or sodium hydroxide concentration, the electrical conductivity of sulfonated tetrafluoroethylene decreases due to the relatively low water content in the electrolyte. Furthermore, the thickness of sulfonated tetrafluoroethylene membranes which is commonly 0.12 mm to 0.25 mm is insufficient for zero gap electrolyzers (cf. non-patent document 11). Due to the relatively high width of the diaphragm which is necessary for mechanical stability, a significant decrease in conductivity via such diaphragms is observed.

As a further alternative, the use of pure polymer-based separators has been discussed. Pure polymer based separators which may, for example, be based on polyphenylene sulfide needle felts are characterized by large pore dimensions and can be used as separators in alkaline water electrolysis only at atmospheric pressures. During an electrolysis process running at elevated pressures, small gas bubbles are formed which can permeate through the pure polyphenylene sulfide felt. Due to their low efficiency, these pure polymer-based separators have not found widespread application in alkaline water electrolysis.

There is thus a need for the development of diaphragms having low toxicity, while exhibiting good ionic conductivity, gas tightness, mechanical, chemical and thermal stability, and cost-effectiveness. Further developments towards the development of advanced, non-toxic materials and asbestos-free technologies are necessary in order to reduce energy consumption and increase efficiency of alkaline water electrolysis processes.

Articles for use as diaphragms or membranes in alkaline water electrolysis should therefore fulfill multiple requirements, such as good gas separation, fast evacuation of bubbles from the surface (low sticking coefficient), high ionic conductivity, and chemical stability in highly concentrated potassium hydroxide or sodium hydroxide solutions at 85° C. or more. Moreover, high mechanical strength is required, taking into account that industrial scale diaphragms have a diameter of 1.6 m or more and are exposed to elevated pressure. Furthermore, the material should be cost effective, environmentally acceptable, and should provide safe operation over at least 20 years.

Non-Patent Documents

Non-patent document 1: Montoneri, E.; Giuffré, L.; Modica, G.; Tempesti, E.; Int. J. Hydrogen Energy 1987, 11(4), 831
Non-patent document 2: Helmet, L.; Mezgolits, H.; Prasser, J.; Schall, A.; Stockmans, W.; Uhde Services and Consulting GmbH, Dortmund, 1984
Non-patent document 3: Divisek, J.; Electrochemical Hydrogen Technologies, Edited by H. Wendt, Elsevier 1990
Non-patent document 4: Divisek, J.; Jung R.; Britz D.; J. Appl. Electrochem. 1990, 20(2), 186
Non-patent document 5: Ghosh, P. C.; Emonts, B.; Janßen, H.; Mergel, J.; Stolten, D.; Sol. Energy 2003, 75(6), 469
Non-patent document 6: Divisek, J.; Malinowski, P.; Mergel, J.; Schmitz, H.; Int. J. Hydrogen Energy 1988, 13(3), 141
Non-patent document 7: Divisek, J.; Schmitz, H.; Balej, J.; J. Appl. Electrochem. 1989, 19(4), 519
Non-patent document 8: Vermeiren, P.; Moreels, J. P.; Leysen, R.; J. Porous Mat. 1996, 3(1), 33
Non-patent document 9: Kerres, J.; Eigenberger, G.; Reichle, S.; Schramm, V.; Hetzel, K.; Schnurnberger, W.; Seybold I.; Desalination 1996, 104(1-2), 47
Non-patent document 10: Leysen, R.; Vandenborre, H.; Mater. Res. Bull. 1980, 15(4), 437
Non-patent document 11: Yeo, R. S.; McBreen, J.; Kissel, G.; Kulesa, F.; Srinivasan, S.; J. Appl. Electrochem. 1980, 10, 741

SUMMARY OF THE INVENTION

The present invention relates to a woven or nonwoven web comprising:
fibers comprising one or more polymers selected from the group consisting of polyarylene sulfides, polyolefins, polyamide imides, polysulfones, polyethersulfones, polyetherketones, polyether etherketones or copolymers thereof; and one or more inorganic salts selected from the group consisting of barium sulfate, strontium sulfate, calcium sulfate, lead(II) sulfate or mixtures thereof;
wherein the one or more inorganic salts are present on the surface of at least part of the fibers.

The woven or nonwoven web according to the present invention can be prepared by a method comprising the steps of:
(i) providing a raw woven or nonwoven web, wherein the woven or nonwoven web has a first and a second major surface and wherein the woven or nonwoven web comprises fibers comprising one or more polymers selected from the group consisting of polyarylene sulfides, polyolefins, polyamide imides, polysulfones, polyethersulfones, polyetherketones, polyether etherketones or copolymers thereof;
(ii) contacting at least part of the woven or nonwoven web with a first solution of a salt of barium, strontium, calcium, lead or a mixture thereof;
(iii) contacting at least part of the woven or nonwoven web with a second solution of a sulfate salt, sulfuric acid or a mixture thereof or with a gas or gas mixture comprising sulfur trioxide; and
(iv) allowing the first solution and the second solution or the gas or gas mixture to come into contact, so that one or more inorganic salts selected from the group consisting of barium sulfate, strontium sulfate, calcium sulfate, lead(II) sulfate or mixtures thereof are formed on the surface of at least part of the fibers.

The woven or nonwoven web according to the present invention can preferably be used as a diaphragm or membrane in alkaline water electrolysis.

The present invention also provides an electrolytic cell comprising the woven or nonwoven web according to the present invention.

Also provided is a method of conducting alkaline water electrolysis, wherein the woven or nonwoven web according to the present invention is used.

DETAILED DESCRIPTION OF THE INVENTION

Figure 1:
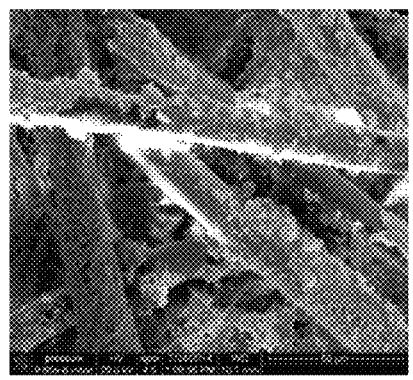
FIG. 1 shows a scanning electron microscopy picture of inorganic salt precipitants on a web of polyphenylene sulfide fibers: a) precipitants concentration 0.1 M, precipitation temperature 8° C., b) precipitants concentration 0.1 M, precipitation temperature 22° C.
Figure 1:
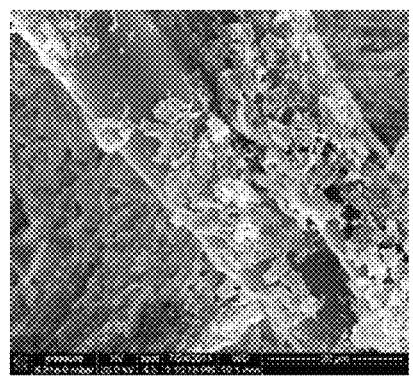
Figure 1:
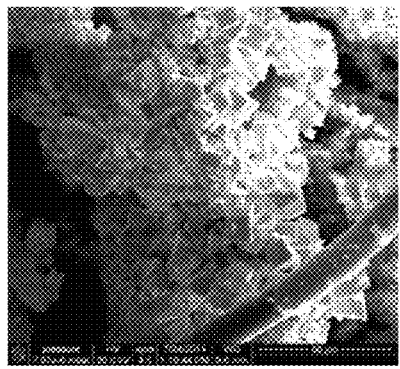
Figure 1:
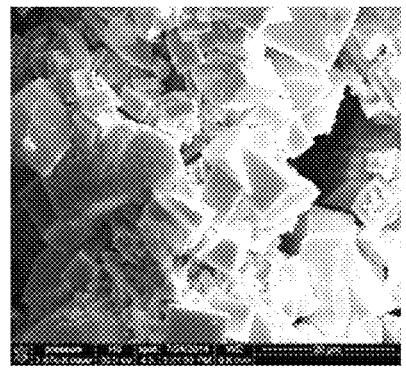

The woven or nonwoven web according to the present invention comprises fibers comprising one or more specific polymers and one or more specific inorganic salts, wherein the one or more inorganic salts are present on the surface of at least part of the fibers.

The one or more polymers comprised in the fibers are selected from the group consisting of polyarylene sulfides, polyolefins, polyamide imides, polysulfones, polyethersulfones, polyetherketones, polyether ether ketones or copolymers thereof. Polyolefins may or may not include halogenated polyolefins. Preferably, the one or more polymers comprised in the fibers of the woven or nonwoven web according to the present invention are selected from the group consisting of polyarylene sulfides, polyolefins, polysulfones, polyether sulfone, polyarylether ketones and copolymers thereof. More preferably, the one or more polymers comprised in the fibers of the woven or nonwoven web according to the present invention are selected from the group consisting of polyphenylene sulfides and polysulfones, e.g. polyarylethersulfones. Still more preferably, the fibers comprised in the woven or nonwoven web according to the present invention comprise polyarylene sulfides or polyolefins, preferably para-polyphenylene sulfide or polypropylene. Most preferably, the fibers consist of polyphenylene sulfide or polypropylene, preferably para-polyphenylene sulfide or polypropylene. A preferred example of polypropylene is syndiotactic polypropylene.

The woven or nonwoven web may comprise fibers of different materials. For example, the woven or nonwoven web may comprise fibers of a first type comprising one type of polymer selected from polyarylene sulfides, polyolefins, polyamide imides, polysulfones, polyethersulfones, polyetherketones, polyether ether ketones or copolymers thereof, and a second type of fibers comprising another type of polymer which is preferably selected from this list. One of the types of fibers may provide a first property such as improved mechanical stability and the second type of fiber may provide a second property such as good gas separation or fast evacuation of bubbles from the surface.

The fibers comprised in the woven or nonwoven web preferably comprise at least about 10 wt-% of at least one of the above types of polymers, more preferably at least about 20 wt-%, at least about 30 wt-%, at least about 40 wt-%, at least about 50 wt-%, at least about 60 wt-%, at least about 70 wt-%, at least about 80 wt-% or at least about 90 wt-%. Most preferably, the fibers consist of at least one of the above types of polymers.

The fibers contained in the woven or nonwoven web according to the present invention may exhibit any average fiber length. Preferably, the average fiber length is from about 0.01 to about 500 µm, more preferably about 0.1 µm to about 500 µm, even more preferably about 1 to about 500 µm, still more preferably about 5 µm to about 400 µm, and most preferably about 10 µm to about 300 µm.

The fibers contained in the woven or nonwoven web according to the present invention may exhibit any average fiber diameter which may be contemplated as being suitable for use in a woven or nonwoven web. Preferably, the average fiber diameter of the fibers comprised in the woven or nonwoven web according to the present invention is from about 0.01 µm to about 20 µm, preferably about 0.1 µm to about 20 µm, more preferably about 0.5 µm to about 15 µm, even more preferably about 1 µm to about 15 µm and most preferably about 5 µm to about 15 µm.

The aspect ratio of the fibers contained in the woven or nonwoven web according to the present invention is preferably 20:1 to 500:1, more preferably 50:1 to 200:1.

Preferably, the fibers contained in the woven or nonwoven web according to the present invention exhibit an average fiber diameter from about 0.01 µm to about 20 µm and an average fiber length from about 0.01 µm to about 500 µm. More preferably, the fibers exhibit an average fiber diameter from about 0.1 µm to about 20 µm and an average fiber length from about 1 µm to about 500 µm. Even more preferably, the fibers exhibit an average diameter from about 0.5 µm to about 15 µm and an average fiber length from about 20 µm to about 300 µm. Still more preferably, the fibers exhibit an average diameter from about 1 to about 15 µm and an average fiber length from about 25 µm to about 200 µm.

The woven or nonwoven web according to the present invention has preferably a thickness of about 20 µm to about 10 mm. More preferably, the thickness of the woven or nonwoven web is from about 30 µm to about 7 mm, more preferably from about 50 µm to about 3 mm, even more preferably from about 100 µm to about 1 mm and most preferably from about 100 µm to about 500 µm.

Especially for specific industrial scale applications, the thickness of the woven or nonwoven web according to the present invention is more preferably from about 50 µm to about 10 mm, even more preferably from about 150 µm to about 8 mm, still more preferably from about 250 µm to about 7 mm and most preferably from about 500 µm to about 5 mm.

The woven or nonwoven web according to the present invention has preferably a density of about 50 to about 1200 $g/m^2$. More preferably, the density of the woven or nonwoven web is from about 70 $g/m^2$ to about 1000 $g/m^2$, more preferably from about 100 $g/m^2$ to about 900 $g/m^2$, even more preferably from about 200 $g/m^2$ to about 800 $g/m^2$ and most preferably from about 300 $g/m^2$ to about 600 $g/m^2$.

The woven or nonwoven web according to the present invention may have any shape. For example, the woven or nonwoven web may have the shape of circular, square-shaped or rectangular sheets. Sheets are objects which are characterized by extending in two dimensions at least 20 times more than in the third dimension. The shape is usually dependent on the type of electrolyzer in which the woven or nonwoven web is intended to be used as a membrane or diaphragm.

As the woven or nonwoven webs, commercially available webs may be used.

The fibers comprised in the woven or nonwoven web of the present invention may comprise one or more organic or inorganic fillers. These fillers may be the same or different from the one or more inorganic salts which are present on the surface of at least part of the fibers. Preferably, the fillers are different from the one or more inorganic salts which are present on the surface of at least part of the fibers. The fillers may comprise conductive, semiconductive or nonconductive materials. Examples of conductive fillers comprise metals, e.g. nickel, tungsten, molybdenum, silver, gold, platinum, iron, aluminum, copper, tantalum, zinc, cobalt, chromium, lead, titanium, tin or alloys thereof. The preferred conductive filler is nickel. The particle size of the fillers may be in the range of 0.01 to 100 µm, preferably 0.05 to 20 µm, more preferably 0.1 to 5 µm and most preferably 0.2 to 2 µm.

Further examples of fillers include silicates, such as clay, talc, wollastonite, and precipitated calcium silicate; oxides, such as aluminum oxide, silica, and titanium dioxide; carbonates, such as precipitated and ground calcium carbonates; and sulfates, such as barium sulfate and calcium sulfate. Preferred examples of fillers include silicates, such as clay, talc, wollastonite, and precipitated calcium silicate; oxides, such as aluminum oxide, silica, and titanium dioxide.

The one or more inorganic salts which are present on the surface of at least part of the fibers are selected from the group consisting of barium sulfate, strontium sulfate, calcium sulfate, lead (II) sulfate or mixtures thereof. Barium sulfate, strontium sulfate and mixtures thereof are preferred. The inorganic salt which is present on the surface of at least part of the fibers is more preferably barium sulfate.

The one or more inorganic salts may be present on the surface of at least part of the fibers in any crystalline or amorphous form. Preferably, the one or more inorganic salts are present in the form of crystals on the surface of at least part of the fibers in the woven or nonwoven web according to the present invention. If there are more than one type of fiber, different types of inorganic salts may be present on different types of fibers.

The one or more inorganic salts are preferably deposited on the fibers after the woven or nonwoven fabric has been formed.

The one or more inorganic salts are comprised in the woven or nonwoven web according to the present invention preferably in an amount of about 0.01 weight percent to about 70 weight percent based on the total weight of the web. More preferably, the amount of the one or more inorganic salts is from about 0.1 to about 60 weight percent based on the total weight of the web. Even more preferably, the amount of the one or more inorganic salts is from about 0.5 to about 50 weight percent based on the total weight of the web. Still more preferably, the amount of the one or more inorganic salts is from about 1 to about 40 weight percent based on the total weight of the web. Still more preferably, the amount of the one or more inorganic salts is from about 5 to about 30 weight percent based on the total weight of the web. Most preferably, the amount of the one or more inorganic salts is from about 10 to about 20 weight percent based on the total weight of the web.

The one or more inorganic salts comprised in the woven or nonwoven web according to the present invention preferably comprise barium sulfate. More preferably, the one or more inorganic salts comprised in the woven or nonwoven web according to the present invention consist of barium sulfate.

If the one or more inorganic salts comprised in the woven or nonwoven web according to the present invention comprise or consist of barium sulfate, the barium sulfate comprises or consists preferably of crystallites having a median particle size ($d_{50}$) of from about 0.01 µm to about 50 µm. More preferably, the barium sulfate comprises or consists of crystallites having a median particle size ($d_{50}$) of from about 0.02 μm to about 5 μm. Even more preferably, the barium sulfate comprises or consists of crystallites having a median particle size ($d_{50}$) of from about 0.05 μm to about 1 μm. Still more preferably, the barium sulfate comprises or consists of crystallites having a median particle size ($d_{50}$) of from about 0.05 μm to about 0.5 μm. Most preferably, the barium sulfate comprises or consists of crystallites having a median particle size ($d_{50}$) of from about 0.1 μm to about 0.5 μm.

Crystallite size may be determined by X-ray Diffraction (XRD), while Scanning Electron Microscopy (SEM) may be used to determine the size of agglomerates.

When determining crystallite size by X-ray Diffraction (XRD), an XRD spectrum of the material containing particles is collected in a first step. Subsequently, the half-width at full maximum value (HWFM) is determined, for example by using XPowder 12 software, for peaks 021, 121 and 002 of the XRD spectra. Calculation of the median crystallite size is conducted using the Scherrer equation which is generally known as:

$$\tau = \frac{K\lambda}{\beta \cos\theta}$$

wherein:
τ [Å] is the mean size of the ordered (crystalline) domains, which may be smaller or equal to the grain size,
K is a dimensionless shape factor, with a value close to unity. The shape factor has a typical value of about 0.89, but varies with the actual shape of the crystallite,
λ [Å] is the incident beam (X-ray) wavelength,
ß [rad] is the line broadening at half maximum intensity (FWHM), after subtracting the instrumental line broadening. This parameter is may also be expressed as "Δ(2θ)", and
θ [rad] is the Bragg angle.

Depending on the temperature and electrolyte concentrations during the precipitation process, crystallites may tend to agglomerate. In such cases, the use of a scanning electron microscopy technique may be advisable to determine the particle size of agglomerates. Due to the typically non-conductive properties of the woven or non-woven web, the samples are subjected to gold sputtering before undertaking scanning electron microscopy measurements. For this purpose, a sputtered gold (Au) layer, e.g. having a thickness of 20 nm, is sufficient for obtaining high quality scanning electron microscope imaging.

In detail, in the scanning electron microscopy method, the samples are fixed onto a planar substrate, and are normally coated with a thin conductive layer, often an amalgam of gold and/or palladium. Then a focused electron beam of typically 5 kV to 50 kV is scanned over the sample in parallel lines. The electrons interact with the sample, producing an array of secondary effects, such as back-scattering, that can be detected and converted into an image. The image is then digitized and presented to an image analyzer, which identifies individual particles and records detailed information about their morphology. In this manner, size and shape of the particles can be accurately assessed. Scanning electron microscopy is often used as a technique for counting particles. The primary benefit of scanning electron microscope analysis is that it provides highly detailed information about not only particle size, but also particle shape and surface texture.

In order to estimate an average grain size from a scanning electron microscopy micrograph, a simple intercept technique can be used. For this purpose, a random straight line is drawn through the micrograph. The number of grain boundaries intersecting the line is counted. The average grain size is determined by dividing the number of intersections by the actual line length. An average grain size equals to 1/(number of intersections/actual length of the line), where the actual line length equals the measured length divided by magnification.

In a preferred embodiment, the woven or non-woven web of the present invention is a non-woven web comprising fibers consisting of p-polyphenylene sulfide, and barium sulfate, wherein the barium sulfate is present on the surface of at least part of the fibers, wherein the average fiber diameter of the polyphenylene sulfide is from about 5 μm to about 20 μm and the nonwoven web has a thickness of about 0.2 to 2 mm.

In a second aspect, the present invention relates to a method of preparing the woven or nonwoven web according to the present invention. The one or more inorganic salts may be deposited by any known method of depositing inorganic salts. Preferably, the one or more inorganic salts are deposited by precipitation from two or more solutions. As a person skilled in the art will appreciate, the woven or nonwoven web according to the present invention may be prepared by any method and is not limited to products prepared according to the method of the second aspect of the present invention.

A method for preparing a woven or nonwoven web according to the present invention comprises the steps of
(i) providing a raw woven or nonwoven web, wherein the woven or nonwoven web has a first and a second major surface and wherein the woven or nonwoven web comprises fibers comprising one or more polymers selected from the group consisting of polyarylene sulfides, polyolefins, polyamide imides, polysulfones, polyethersulfones, polyetherketones, polyether etherketones or copolymers thereof;
(ii) contacting at least part of the woven or nonwoven web with a first solution of a salt of barium, strontium, calcium, lead or a mixture thereof;
(iii) contacting at least part of the woven or nonwoven web with a second solution of a sulfate salt, sulfuric acid or a mixture thereof or with a gas or gas mixture comprising sulfur trioxide; and
(iv) allowing the first solution and the second solution or gas or gas mixture to come into contact, so that one or more inorganic salts selected from the group consisting of barium sulfate, strontium sulfate, calcium sulfate, lead(II) sulfate or mixtures thereof are formed on the surface of at least part of the fibers.

In the method of the present application, steps (ii) and (iii) may be conducted in any order. Furthermore, there may be additional steps between each of the steps. One additional step may comprise complete or partial drying the woven or nonwoven web between steps (ii) and (iii), or between steps (iii) and (ii). In this case, the coming into contact of the solutions in step (iv) may have the meaning that the dried matter from the first solution comes into contact with the second solution or vice versa. It is to be understood that if a gas or gas mixture comprising sulfur trioxide is used in step (iii), the term "solution", e.g. in step (iv), refers also to this gas or gas mixture.

The "raw woven or nonwoven web" used in the method for preparing a woven or nonwoven web according to the present invention differs from the woven or nonwoven web according to the present invention preferably only in that it does not comprise one or more inorganic salts selected from the group consisting of barium sulfate, strontium sulfate, calcium sulfate, lead(II) sulfate or mixtures thereof on the surface the fibers of the woven or nonwoven web. Any other features and characteristics of the woven or nonwoven web such as the type of polymer(s) comprised in the fibers, average fiber diameter and average fiber length described herein are preferably also applicable to the "raw woven or nonwoven web", unless explicitly stated otherwise.

The raw woven or nonwoven web and the woven or nonwoven web according to the present invention may be any type of woven or nonwoven web known to a skilled person. Examples include webs which are obtained by needle felting, carded, air laid, wet laid, spunlaced, spunbonding, electro-spinning or melt-blowing techniques, such as melt-spun or melt-blown, or combinations thereof.

In a preferred embodiment of the present invention, at least part of the first major surface of the woven or nonwoven web is contacted with the first solution and then at least part of the second major surface of the woven or nonwoven web is contacted with the second solution, gas or gas mixture.

In a particularly preferred embodiment of the present invention, the woven or nonwoven web is produced in a continuous manner in which the contacting of the web with the first solution and the second solution or gas or gas mixture is conducted simultaneously or subsequently.

If the contacting with the first solution and the second solution or gas or gas mixture is conducted subsequently, be it in a continuous or discontinuous manner, the web may be dried between the two steps of contacting, or the second step of contacting may be conducted without a preceding drying step.

It is to be understood that the step of contacting at least part of the woven or nonwoven web with a first solution of a salt of barium, strontium, calcium, lead or a mixture thereof and the step of contacting at least part of the woven or nonwoven web with a second solution of a sulfate salt, sulfuric acid or a mixture thereof or with a gas or gas mixture comprising sulfur trioxide may be conducted in any order and may be conducted with or without intervening steps.

It is especially preferable, that the process be conducted in a roll-to-roll manner. Roll-to-roll is a family of manufacturing technique involving continuous processing of a flexible substrate while it is transferred between two moving rolls of material. Other methods include sheet-to-sheet, sheets-on-shuttle, and roll-to-sheet processes.

In another preferred embodiment of the present invention, at least part of the first major surface and at least part of the second major surface of the woven or nonwoven web is contacted with the first solution and then at least part of the first major surface and at least part of the second major surface of the woven or nonwoven web is contacted with the second solution, gas or gas mixture.

The first solution comprises preferably a perchlorate, chlorate, chloride, iodide or bromide salt of barium, strontium, calcium, lead or a mixture of these salts. More preferably, the first solution comprises a perchlorate or chloride of barium, strontium or calcium or a mixture of these salts. Still more preferably, the first solution comprises a perchlorate or chloride of barium or strontium or a mixture of these salts. Even more preferably, the first solution comprises a perchlorate of barium or strontium or a mixture of these salts. Most preferably, the first solution comprises a perchlorate of barium.

The second solution preferably comprises a sulfate salt, sulfuric acid or a mixture thereof. The sulfate salt comprises any sulfates and hydrogen sulfates except barium sulfate, strontium sulfate, calcium sulfate, lead(II) sulfate or mixtures thereof. Specific examples include ammonium sulfate, lithium sulfate, sodium sulfate, potassium sulfate, rubidium sulfate, cesium sulfate, magnesium sulfate, titanium sulfates, manganese sulfates, iron sulfates, cobalt sulfate, nickel sulfates, copper sulfates, zinc sulfate, yttrium sulfate, zirconium sulfate, lanthanum sulfate, cerium sulfates, aluminium sulfate, gallium sulfate and the corresponding hydrogen sulfates and mixtures thereof. Preferred examples are sodium sulfate, potassium sulfate and sulfuric acid.

The term "solution" as used herein also covers dispersions, e.g. pastes. In such dispersions, some of the salts may only be partially dissolved in the solvent. Dispersions are materials comprising more than one phase where at least one of the phases consists of finely divided phase domains, which may optionally be in the colloidal size range, dispersed throughout a continuous phase.

In a further embodiment of the present invention, a gas or gas mixture comprising sulfur trioxide may be used instead of, or in addition to, the second solution. Examples of such gas mixtures are neat sulfur trioxide, mixtures of sulfur trioxide in air or sulfur trioxide in nitrogen.

The molar concentration of the first and second solution is preferably within the range of from about 0.0001 M about 10 M. The molar concentration of the first solution may be chosen independently from the molar concentration in the second solution, and vice versa. More preferably, the molar concentration of the first and/or second solution is within the range from about 0.001 M to about 5 M. Even more preferably, the molar concentration of the first and/or second solution is within the range from about 0.01 M to about 2 M. Still more preferably, the molar concentration of the first and/or second solution is in the range from about 0.05 M to about 1 M. Most preferably, the molar concentration of the first and/or second solution is in the range of from about 0.05 M to about 0.5 M.

The ratio between the molar concentrations of the first and the second solution is preferably within the range from about 5:1 to about 1:5, more preferably within the range from about 3:1 to about 1:3, even more preferably within the range from about 2:1 to about 1:2, still more preferably within the range from about 1.5:1 to about 1:1.5. Most preferably, the ratio between the molar concentrations of the first and the second solution is about 1:1.

The woven or nonwoven web is preferably contacted with the first and/or the second solution for a duration of about 1 second to about 750 hours, more preferably for a duration of about 1 second to about 72 hours, even more preferably for a duration of about 1 second to about 20 hours, still more preferably for a duration of about 1 second to about 1 hour, still more preferably for a duration of about 1 second to about 30 minutes and most preferably for a duration of about 1 second to about 1 minute. If the contacting with the first and second solution is conducted at different points in time, or if the web is contacted with the first and second solution on different areas of its surface, the contacting times may be chosen independently for the first and second solution.

At least one of the steps of the method for preparing a woven or nonwoven web according to the present invention are conducted at a temperature within the range from about 0° C. to about 100° C., preferably from about 0° C. to about 90° C., more preferably from about 5° C. to about 80° C., even more preferably from about 7° C. to about 70° C., still more preferably from about 8° C. to about 60° C., still more preferably from about 8° C. to about 50° C., still more preferably from about 8° C. to about 40° C., still more preferably from about 10° C. to about 35° C. and most preferably from about 15° C. to about 30° C.

One or more of the steps in the method for preparing a woven or nonwoven web according to the present invention may be conducted at a pressure in the range from 10 kPa to 20 MPa. Moreover, the pressure may be independently chosen for each step and may be different on different parts of the surface of the woven or nonwoven web. Preferably, the pressure may be in the range from 50 kPa to 10 MPa, more preferably in the range from 100 kPa to 5 MPa and even more preferably in the range from 100 kPa to 1 MPa.

In a preferred embodiment of the present application, the first or second solution employed in the method for preparing the woven or nonwoven web according to the present invention may be an aqueous solution. More preferably, the first and second solutions are aqueous solutions.

In another preferred embodiment of the present application, the first and/or second solutions may be solutions containing one or more organic solvents. Organic solvents may be any organic solvents known to the person skilled in the art. Preferably, the organic solvents are chosen from organic solvents in which the woven or nonwoven web is insoluble or only sparingly soluble. The organic solvents may be miscible or immiscible with aqueous solutions. Organic solvents which are miscible with aqueous solutions include methanol, ethanol, propanol, isopropanol, ethylene glycol, diethyleneglycol, triethylene glycol, propylene glycol, glycerol, dimethylformamide, dimethylsulfoxide, 1,4-dioxene, tetrahydrofuran, acetonitrile, acetic acid, butanone and acetone. Other examples of organic solvents are 1-butanol, 2-butanol, chloroform, dichloromethane, trichloroethane, hexane, cyclohexane, heptane, octane, decane, ethyl acetate, diethylether, methyl t-butyl ether (MTBE), petroleum ether, toluene and xylenes.

In another embodiment of the present invention, precipitation of the one or more inorganic salts may be conducted by applying a solution of the one or more inorganic salts in the first solvent to at least part of the woven or nonwoven web and subsequently adding a solvent which is different from the first solvent, e.g. in order to decrease the solubility of the one or more inorganic salts.

The woven or nonwoven web according to the present invention may be used as a diaphragm or membrane in alkaline water electrolysis. The diaphragm or membrane of the present invention is suitable for installation in alkaline water electrolyzers regardless of their type, which may include zero gap type or non-zero gap type, and regardless of operating pressure, thickness and capacity. For example, these alkaline water electrolyzers may operate at atmospheric pressure or be pressurized, i.e. operate at pressures above atmospheric pressure. Furthermore, these alkaline water electrolyzers may, e.g., be unipolar or bipolar.

The term "diaphragm" in this application refers to articles which consist of non ion-selective materials. In contrast, the term "membrane" as used in this application refers to articles which consist of ion-selective materials. The term "ion-selective" refers to the property of having increased or decreased permeability for at least one type of ion. Any of the woven or nonwoven webs according to the present invention may be used either as diaphragms or as membranes. A general term which is also used and includes both diaphragms and membranes is a separator.

Furthermore, the present invention relates to an electrolytic cell comprising the woven or nonwoven web according to the present invention.

In yet a further aspect, the present invention relates to a method of conducting alkaline water electrolysis, wherein the woven or nonwoven web according to the present invention is used. Preferably, the woven or nonwoven web according to the present invention is used as a diaphragm or membrane in a method of conducting alkaline water electrolysis. More preferably, the woven or nonwoven web according to the present invention is used as a diaphragm or membrane in a zero-gap setup of a method of conducting alkaline water electrolysis. In such a setup, preferably one or two of the electrodes are in direct contact with the diaphragm or membrane.

Electrolyzing water steam instead of liquid water diminishes the electrical energy demand. Moreover, ohmic losses decrease when the temperature of the alkaline water electrolysis increases. It is therefore preferred that the alkaline water electrolysis be conducted at elevated temperatures, preferably at temperatures in the range from 85° C. to 180° C., more preferably 90° C. to 160° C.

Furthermore, the woven or nonwoven web according to the present invention may also be used as a diaphragm or membrane in chlor-alkali electrolysis cells. In these cells, NaCl solutions are generally used as electrolyte and one role of a diaphragm or membrane is to prevent the reaction of the reaction products caustic soda (NaOH), hydrogen and chlorine. For use as a diaphragm or membrane in chlor-alkali electrolysis cells, the membrane may preferably be modified to block the passage of hydroxide and/or chloride ions. For example, the membrane may be modified by precipitating or co-precipitating salts containing chloride or hydroxide anions.

In a preferred embodiment of the invention, a polymer based needle felt, preferably polyphenylene sulfide (PPS), is modified for the use as a separator in alkaline water electrolyzers at elevated pressures up to 120 bar, preferably between 1 bar and 80 bar, by precipitating barium sulfate ($BaSO_4$) crystals into a polyphenylene sulfide matrix to reduce the matrix's pore dimensions and consequently to improve the gas tightness properties of the separator. The precipitation process of barium sulfate may take place from the fluid phase. In this preferred embodiment, two electrolytes are used to generate the crystals: sulfuric acid ($H_2SO_4$) and barium perchlorate ($Ba(ClO_4)_2$). The precipitation process follows the equation:

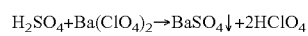

$$H_2SO_4 + Ba(ClO_4)_2 \rightarrow BaSO_4\downarrow + 2HClO_4$$

In order to produce the advanced composite separator, polyphenylene sulfide (PPS) felt is clamped in-between two compartments of the precipitation cell. One compartment is filled with sulfuric acid ($H_2SO_4$), while the second compartment is simultaneously filled with barium perchlorate ($Ba(ClO_4)_2$). Both liquids intrude into the felt. At the layer inside the porous structure of the felt or on its surface where the two liquids get into contact, the formation of the barium sulfate ($BaSO_4$) crystals starts. SEM images of the precipitation inside the fiber matrix structure are shown in FIG. 1.

Two contradictory criteria required for gas separators in alkaline water electrolysis—high ionic conductivity and low gas permeability—are optimally fulfilled when mixing sulfuric acid ($H_2SO_4$) and barium perchlorate ($Ba(ClO_4)_2$), each having a concentration of 0.1 M, at 22° C. Another parameter which is believed to be influencing the precipitation process is the precipitation duration which is preferably between 0.5 h and 72 hours. After the precipitation process, the manufactured separator may be rinsed with distilled water and optionally dried if this would facilitate the transport before its application in an alkaline water electrolyzer.

The present inventors have found that the ionic conductivity of the woven or nonwoven web according to the present invention comprising polyphenylene sulfide with barium sulfate present on the surface of the fibers is about 20% higher than for asbestos diaphragms. The oxygen gas tightness is about 90% higher than for pure polyphenylene sulfide diaphragms and about 15% lower than for asbestos diaphragms. In addition, the measured hydrogen gas tightness of a woven or nonwoven web according to the present invention comprising polyphenylene sulfide with barium sulfate present on the surface of the fibers is so good that the hydrogen concentration on the oxygen side of an alkaline water electrolysis cell is below the detection limit, i.e. below 0.01%. It was shown that the precipitation of $BaSO_4$ into the polyphenylene sulfide felt reduces the gas crossover through the separator enabling high purities of the produced gases hydrogen and oxygen. These properties bring the separators comprising the woven or nonwoven web according to the present invention closer to asbestos with respect to gas tightness, while surpassing asbestos with respect to ionic conductivity.

While not wishing to be bound by theory, it is believed that the ion transport through the membrane is governed by the saturation concentration of $Ba^{2+}$, $SO_4^{2-}$ and $HSO_4^-$ ions which is lower than the saturation concentration of $H^+$ and $OH^-$ ions. Therefore, $Ba^{2+}$ and $SO_4^{2-}$ strongly interact, while $H^+$ and $OH^-$ do not and can unimpededly pass across the membrane.

The present inventors have surprisingly found that immersion of polyphenylene sulfide with precipitated $BaSO_4$ in potassium hydroxide solution has a significant influence on the conductivity of the membranes, which increases with the immersion duration. The influence of immersion duration is less pronounced for pure polyphenylene sulfide diaphragms than for asbestos diaphragms and polyphenylene sulfide membranes with precipitated $BaSO_4$. Longer exposure to potassium hydroxide solutions or sodium hydroxide solutions does not influence significantly the permeation properties of the samples of polyphenylene sulfide with precipitated $BaSO_4$.

It was found that membrane bending onto metallic cylinders led to weight reduction. After bending onto 50 mm cylinders, oxygen permeation increased by about 12%, while the bending onto a bigger cylinder (corresponding to higher rubber band pressure) resulted in an increase of oxygen permeation of about 30%, compared to non-bent samples of polyphenylene sulfide with $BaSO_4$.

When using the woven or nonwoven webs according to the present invention as membranes in electrolyzers, they are preferably installed in the electrolytic cell in such a manner that the side which was exposed to the $Ba(ClO_4)_2$ solution during the precipitation process (smoother side in the case of the reference PPS matrix 306P41 5/5, area weight 550 g/m², 2 mm thickness, supplied by Heimbach Filtration) faces the cathode (hydrogen generation site) and the side which was exposed to the $H_2SO_4$ solution during the precipitation process (coarser side in the case of PPS matrix 306P41 5/5) faces the anode (oxygen generation site).

In a preferred embodiment of the present invention, the method for preparing a woven or nonwoven web comprises the steps of:
(i) providing a raw woven or nonwoven web, wherein the woven or nonwoven web has a first and a second major surface and wherein the woven or nonwoven web comprises fibers consisting of p-polyphenylene sulfide,
(ii) contacting part of the woven or nonwoven web with a first solution of barium perchlorate or barium chloride at a concentration of 0.02 to 0.5 M at 15 to 30° C.,
(iii) contacting part of the woven or nonwoven web with a second solution of sodium sulfate or sulfuric acid at a concentration of 0.02 to 0.5 M at 15 to 30° C.; and
(iv) allowing the first solution and the second solution or the gas or gas mixture to come into contact, so that crystals of $BaSO_4$ are formed on the surface of part of the fibers.

Optimal results, i.e. the highest ionic conductivity in combination with the lowest oxygen permeability, are achieved with precipitant concentrations of 0.1 M and a precipitation temperature of 22° C.

More specifically, the present invention may be described by the following items 1 to 42:

1. A woven or nonwoven web comprising:
fibers comprising one or more polymers selected from the group consisting of polyarylene sulfides, polyolefins, polyamide imides, polysulfones, polyethersulfones, polyetherketones, polyether etherketones or copolymers thereof; and
one or more inorganic salts selected from the group consisting of barium sulfate, strontium sulfate, calcium sulfate, lead(II) sulfate or mixtures thereof;
wherein the one or more inorganic salts are present on the surface of at least part of the fibers.

2. The woven or nonwoven web according to item 1, wherein the one or more inorganic salts have been provided on the surface of at least part of the fibers by precipitation.

3. The woven or nonwoven web according to item 1 or 2, wherein the polymer comprises or consists of polyarylene sulfide, especially polyphenylene sulfide.

4. The woven or nonwoven web according to item 1 or 2, wherein the polymer comprises or consists of polyolefin, especially polypropylene.

5. The woven or nonwoven web according to any one of the preceding items, wherein the average fiber diameter is from about 0.01 μm to about 20 μm and/or the average fiber length is from about 0.01 μm to about 500 μm.

6. The woven or nonwoven web according to any one of the preceding items, wherein the woven or nonwoven web has a thickness of about 20 μm to about 10 mm.

7. The woven or nonwoven web according to any one of the preceding items, wherein the woven or nonwoven web has a density of about 100 g/cm² to about 600 g/cm².

8. The woven or nonwoven web according to any one of the preceding items, wherein the woven or nonwoven web comprises the one or more inorganic salts in an amount of about 0.01 wt-% to about 70 wt-% based on the total weight of the woven or non-woven web.

9. The woven or nonwoven web according to any one of the preceding items, wherein the one or more inorganic salts comprise or consist of barium sulfate.

10. The woven or nonwoven web according to item 9, wherein the barium sulfate comprises or consists of crystallites having a median particle size ($d_{50}$) of size of from about 0.01 to about 50 μm.

11. A method for preparing a woven or nonwoven web according to any one of items 1 to 10 comprising the steps of:
(i) providing a raw woven or nonwoven web, wherein the woven or nonwoven web has a first and a second major surface and wherein the woven or nonwoven web comprises fibers comprising one or more polymers selected from the group consisting of polyarylene sulfides, polyolefins, polyamide imides, polysulfones, polyethersulfones, polyetherketones, polyether etherketones or copolymers thereof;
(ii) contacting at least part of the woven or nonwoven web with a first solution of a salt of barium, strontium, calcium, lead or a mixture thereof;
(iii) contacting at least part of the woven or nonwoven web with a second solution of a sulfate salt, sulfuric acid or a mixture thereof or with a gas or gas mixture comprising sulfur trioxide; and
(iv) allowing the first solution and the second solution or the gas or gas mixture to come into contact, so that one or more inorganic salts selected from the group consisting of barium sulfate, strontium sulfate, calcium sulfate, lead(II) sulfate or mixtures thereof are formed on the surface of at least part of the fibers.

12. The method for preparing the woven or nonwoven web according to item 11 comprising the steps of:
(i) providing the raw woven or nonwoven web;
(ii) contacting at least part of the first major surface of the woven or nonwoven web with the first solution;
(iii) contacting at least part of the second major surface of the woven or nonwoven web with the second solution thereof or with the gas or gas mixture comprising sulfur trioxide; and
(iv) allowing the first solution and second solution or the gas or gas mixture to come into contact.

13. The method for preparing the woven or nonwoven web according to item 11 comprising the steps of:
(i) providing the raw woven or nonwoven web;
(ii) contacting at least part of the first major surface and at least part of the second major surface of the woven or nonwoven web with the first solution;
(iii) contacting at least part of the first major surface and at least part of the second major surface of the woven or nonwoven web with the second solution or with the gas or gas mixture comprising sulfur trioxide; and
(iv) allowing the first solution and second solution or the gas or gas mixture to come into contact.

14. The method according to any one of items 11 to 13, wherein the first solution comprises a perchlorate, chlorate, chloride, iodide, or bromide salt of barium, strontium, calcium, lead or a mixture of these salts.

15. The method according to any one of items 11 to 13, wherein the first solution comprises a perchlorate, chlorate or chloride salt of barium or strontium or a mixture of these salts.

16. The method according item 15, wherein the first solution comprises a perchlorate, or chloride salt of barium or a mixture of these salts.

17. The method according item 16, wherein the first solution comprises a chloride salt of barium.

18. The method according to any one of items 11 to 17, wherein the second solution comprises a sulfate salt, sulfuric acid or a mixture thereof.

19. The method according to item 18, wherein the second solution comprises a sulfate salt.

20. The method according to item 19, wherein the second solution comprises a sulfate salt of sodium or potassium.

21. The method according to item 19, wherein the second solution comprises sodium sulfate.

22. The method according to any one of items 11 to 21, wherein the ratio of the molar concentrations of the first solution to the second solution is within the range of about 5:1 to about 1:5.

23. The method according to any one of items 11 to 22, wherein the molar concentration of the first and second solution is within the range from about 0.0001 M to about 10 M.

24. The method according to any one of items 11 to 23, wherein the woven or nonwoven web is contacted with the first solution and the second solution or the gas or gas mixture for a duration of about 1 second to about 750 hours.

25. The method according item 24, wherein the woven or nonwoven web is contacted with the first solution and the second solution or the gas or gas mixture for a duration of about 1 second to about 1 hour.

26. The method according item 24, wherein the woven or nonwoven web is contacted with the first solution and the second solution or the gas or gas mixture for a duration of about 1 second to about 10 minutes.

27. The method according to any one of items 11 to 26, wherein one or more of the steps are conducted at a temperature within the range from about 0° C. to about 200° C.

28. The method according to any one of items 11 to 27, wherein one or more of the steps are conducted at a pressure of about 10 kPa to about 20 MPa.

29. The method according to any one of items 11 to 28, wherein at least one of the first and second solution or both are aqueous solutions.

30. The method according to any one of items 11 to 29, wherein at least one of the first and second solution or both are solutions containing one or more organic solvents.

31. The method according to any one of items 11 to 30, wherein steps ii) and iii) are conducted simultaneously.

32. The method according to any one of items 11 to 30, wherein steps ii) and iii) are conducted sequentially.

33. The method according to item 32, wherein step ii) is conducted before step iii).

34. The method according to item 32, wherein step iii) is conducted before step ii).

35. The method according to any one of items 32 to 34, wherein the woven or nonwoven web is dried between steps ii) and iii).

36. The method according to any one of items 11 to 35, wherein the first solution comprises a perchlorate, or chloride salt of barium or a mixture of these salts, and wherein the second solution comprises a sulfate salt, sulfuric acid or a mixture thereof.

37. The method according to any one of items 11 to 35, wherein the first solution comprises barium chloride, and wherein the second solution comprises sodium sulfate.

38. The method according to any one of items 11 to 35, wherein the first solution comprises barium chloride, and the second solution comprises sodium sulfate, and wherein the woven or nonwoven web comprises fibers comprising one or more polymers selected from the group consisting of polyarylene sulfides and polyolefins.

39. The method according to any one of items 11 to 35, wherein the first solution comprises barium chloride, and the second solution comprises sodium sulfate, and wherein the woven or nonwoven web comprises fibers comprising one or more polymers selected from the group consisting of polyphenylene sulfides and polypropylene.

40. Use of the woven or nonwoven web according to any one of items 1 to 10 as a diaphragm or membrane in alkaline water electrolysis.

41. An electrolytic cell comprising the woven or nonwoven web according to any one of items 1 to 10.

42. A method of conducting alkaline water electrolysis, wherein the woven or nonwoven web according to any one of items 1 to 10 is used.

Various modifications and variations of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be covered by the present invention.

The following examples are merely illustrative of the present invention and should not be construed to limit the scope of the invention which is defined by the appended claims.

EXAMPLES

Materials

The polyphenylene sulphide (PPS) needle felt used in this study has a thickness of 2 mm and was provided by Heimbach GmbH. The polyphenylene sulphide (PPS) type was 306P41 5/5, with an area weight of 550 g m$^{-2}$ and an air permeability of 160 l dm$^{-2}$ min$^{-1}$ at 200 Pa. The asbestos membrane samples of a 4 mm thickness were typical diaphragms for alkaline electrolyzers (chrysotile, $Mg_3Si_2O_5(OH)_4$).

Zirfon Perl® (AGFA) with a thickness of 0.5 mm has been also used for comparative purposes.

Anhydrous barium perchlorate and sulfuric acid (95-97%) were purchased from Alfa Aesar and J. T. Baker, respectively, and were used without further purification. Solutions of barium perchlorate and sulfuric acid (95-97%) were prepared by dissolving corresponding amounts thereof in deionized water.

Electrolytes used in this study were 25 wt. % potassium hydroxide corresponding to a typical electrolyte used in high-pressure zero-gap alkaline water electrolyzers and 35 wt. % sodium hydroxide corresponding to a typical electrolyte used in brine electrolysis.

Precipitation Methods

Precipitation of $BaSO_4$ into the Basic Membrane Material (Lab Scale)

Figure 2:
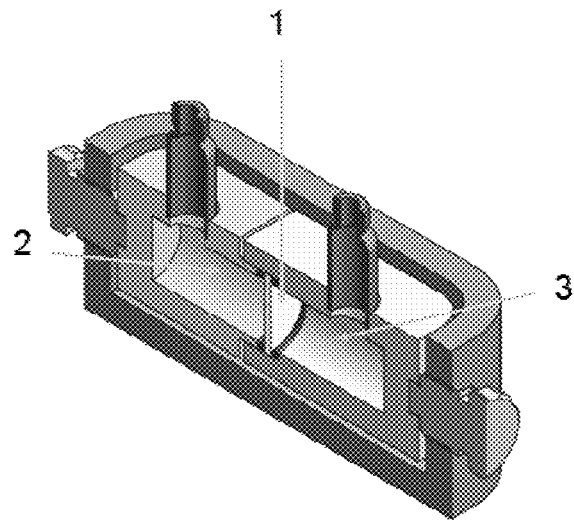
FIG. 2 shows a precipitation cell for precipitating inorganic salts onto the fibers of a raw woven or non-woven web (lab scale): (1)—polyphenylene sulphide (PPS) web with 20 mm diameter; (2)—0.1 M $Ba(ClO_4)_2$; (3)—0.1 M $H_2SO_4$.

The cell used for the production of the lab scale precipitation membranes (diameter 20 mm, thickness 2 mm) consists of two compartments (FIG. 2). The polyphenylene sulfide basic membrane material (1) was fixed in-between the compartments. Solutions of 0.1 M barium perchlorate (2) and 0.1 M sulfuric acid (3) were simultaneously poured into the respective compartments. The precipitation took place in the basic membrane material body by allowing these solutions to interact via the membrane for a period of three days at room temperature.

The weight of one lab scale polyphenylene sulfide membrane sample was measured before and after the precipitation. The weight before the precipitation was 0.183 g, while after the precipitation in a cell such as shown in FIG. 2, the lab scale polyphenylene sulfide membrane sample weight increased to 0.213 g.

Precipitation of $BaSO_4$ into the Basic Membrane Material (Prototype Scale)

Figure 3:
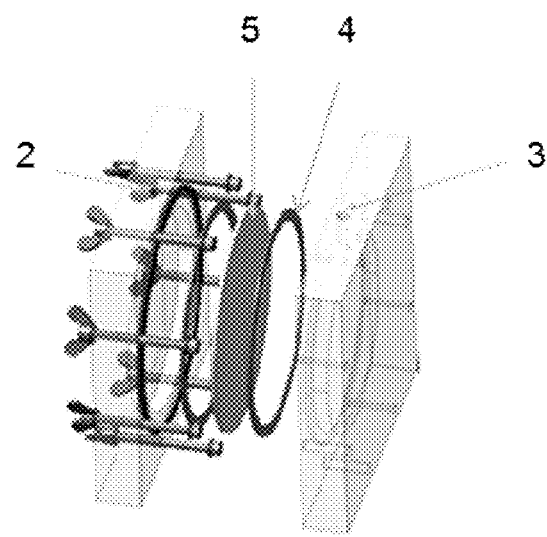
FIG. 3 shows a precipitation cell for precipitating inorganic salts onto the fibers of a raw woven or non-woven web (prototype testing scale). (4)—flat O-rings; (5)—polyphenylene sulphide (PPS) with 300 mm diameter; (2)—0.1 M $Ba(ClO_4)_2$; (3)—0.1 M $H_2SO_4$.

In order to test the membranes under industrial conditions in a prototype electrolyzer, a bigger precipitation cell was designed, where a polyphenylene sulfide matrix of 300 mm diameter and a thickness of 2 mm was installed (4) and subjected to precipitation process with the same precipitants (2 and 3). The weight of one prototype size polyphenylene sulfide membrane sample before precipitation was 39.036 g. After the precipitation in a cell such as shown in FIG. 3, the polyphenylene sulfide membrane sample weight increased to 43.590 g.

Conditioning of Membranes

Figure 4:
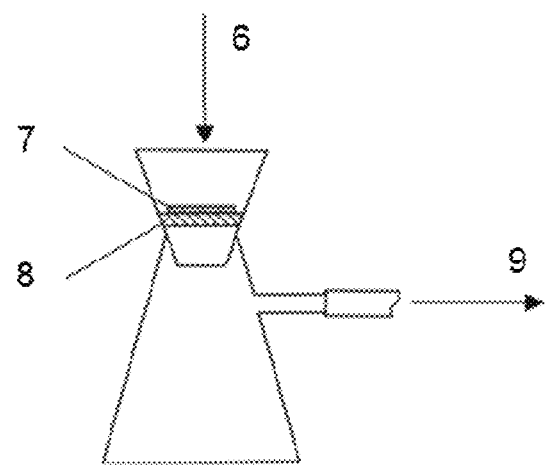
FIG. 4 shows an apparatus for soaking electrolyte into the membrane material: (6)—25 wt. % KOH; (7)—separator (membrane); (8)—ceramic frit; (9)—to vacuum pump.

All membranes were soaked with 25 wt. % potassium hydroxide electrolyte prior to measurements using a device such as shown in FIG. 4. The electrolyte (6) was poured onto the membrane (7) placed on a ceramic frit (8) and forced through the membrane body using a vacuum pump (9).

Characterization Methods

General

Figure 5:
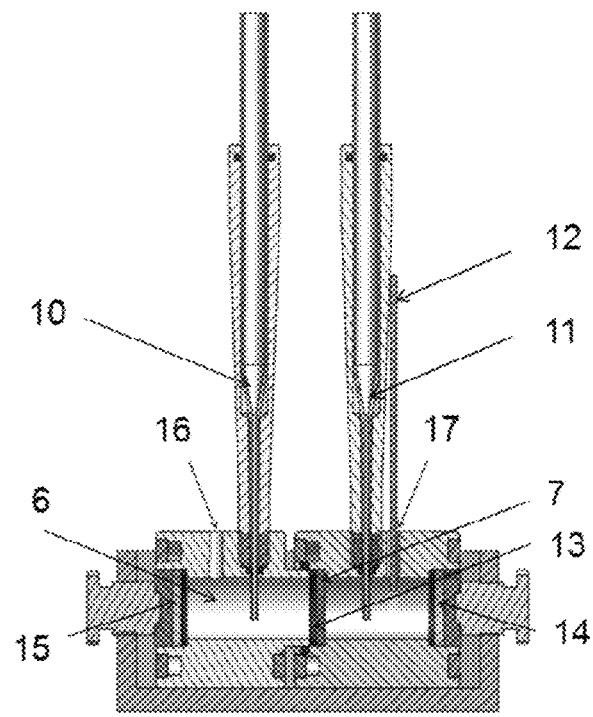
FIG. 5 shows a non-zero gap electrochemical cell which may be used for membrane resistance and oxygen permeation measurements: (10)—$Pb/PbF_2$ reference electrode; (11)—$Pb/PbF_2$ sense electrode; (12)—PVC capillary (holder for a QMS detection capillary); (13)—O-ring; (14)—cathode Ni disk; (15)—anode Ni disk; (16)—non-zero gap oxygen outlet; (17)—non-zero gap hydrogen outlet.
Figure 6:
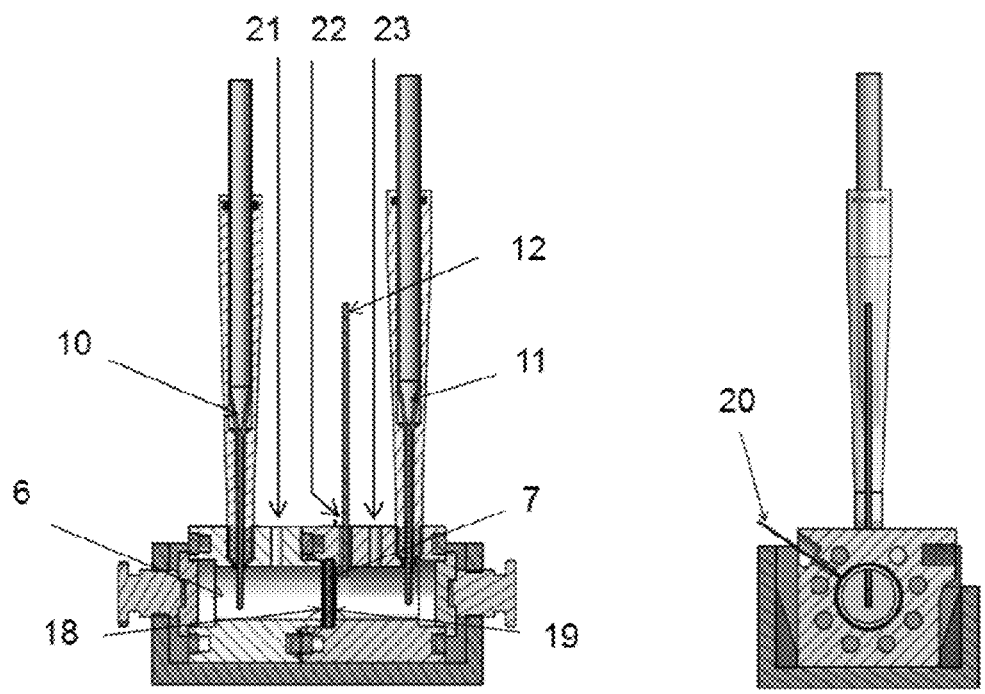
FIG. 6 shows a zero gap electrochemical cell which may, for example, be used for simplified membrane resistance determination. (18)—anode Ni mesh; (19)—cathode Ni mesh; (20)—electric connection for cathode Ni mesh; (21)—zero gap oxygen outlet; (22)—quadrupole mass spectrometer capillary opening; (23)—zero gap hydrogen outlet.

Besides the production of the separator material, the methodology for the ionic conductivity and gas tightness determination has been developed by the inventors and published in Electrochimica Acta 2014, 127, pages 153 to 158. Optimization of these two parameters, which in fact are contradicting requirements, can lead to an improvement of the electrolysis process efficiency. Therefore, both non-zero gap and zero gap atmospheric pressure laboratory scale set-ups, operating at room temperature, were built in house, and as shown in FIG. 5 and FIG. 6, respectively.

Figure 7:
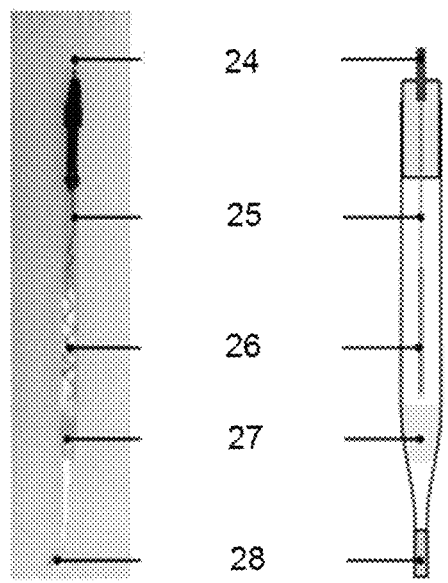
FIG. 7 shows a reference electrode based on $Pb/PbF_2$. (24)—external contact; (25)—lead wire; (26)—lead fluoride, (27)—cotton trap; (28)—reference electrode ceramic frit.

The non-zero gap cell (FIG. 5) is a two-compartment four-electrode cell filled with 25 wt. % potassium hydroxide (6). Two Ni disks, serving as an anode (15) and a cathode (14), are placed far from the separator (7) installed in-between the compartments. Two lead/lead fluoride electrodes (−0.317 V vs. NHE, at 25° C.), depicted in detail in FIG. 7, are used as a sense (10) and a reference electrode (11). Openings marked as (16) and (17) served as oxygen and hydrogen outlets, respectively.

The zero gap cell (FIG. 6) differs from the non-zero gap cell in that the separator (7) is sandwiched in-between two Ni meshes, serving as anode (18) and cathode (19). In this cell, the sense (10) and reference electrode (11) are placed outside of the current lines and their immersion depth cannot influence the measured resistance. The electric connection of the cathode (20) is symmetrical to the one of the anode which is situated to the left of the membrane (7). Openings marked as (21) and (23) serve as oxygen and hydrogen outlets, respectively, in the zero gap cell.

The non-zero gap cell (5) also enables the monitoring of oxygen which was generated during electrolysis in the anodic compartment, managed to cross the separator and reduced the purity of the produced hydrogen in the cathodic compartment, when coupled with a Quadrupole Mass Spectrometer (QMS). The QMS detection capillary is placed in a PVC holder (12).

Resistance Measurements

Both zero gap and non-zero gap set-ups were used for resistance measurements. Resistance measurements were performed using electrochemical impedance spectroscopy (EIS) in galvanostatic mode with a Gamry potentiostat. At least three measurements were conducted with every membrane type (polyphenylene sulfide, polyphenylene sulfide with $BaSO_4$, asbestos and Zirfon Perl®). Measurements without the membrane were undertaken only in the non-zero gap set-up in order to avoid short-circuiting in the zero gap set-up when the membrane was not installed. The frequency was swept from 1 KHz to 100 mHz, while the applied direct current density was 160 and 200 mA/cm$^2$ (providing electrolysis conditions during measurements) with an alternating current amplitude of 10 mA/cm$^2$. Both current densities, 160 and 200 mA/cm$^2$, are similar to the current densities applied in industrial alkaline water electrolyzers.

In the non-zero gap set-up, the immersion depth of the reference electrode and sense electrode was only about 2 mm into the solution, in order to provide a contact, but not to impede the current flow. The cell was completely filled with the 25 wt. % potassium hydroxide solution.

Figure 8:
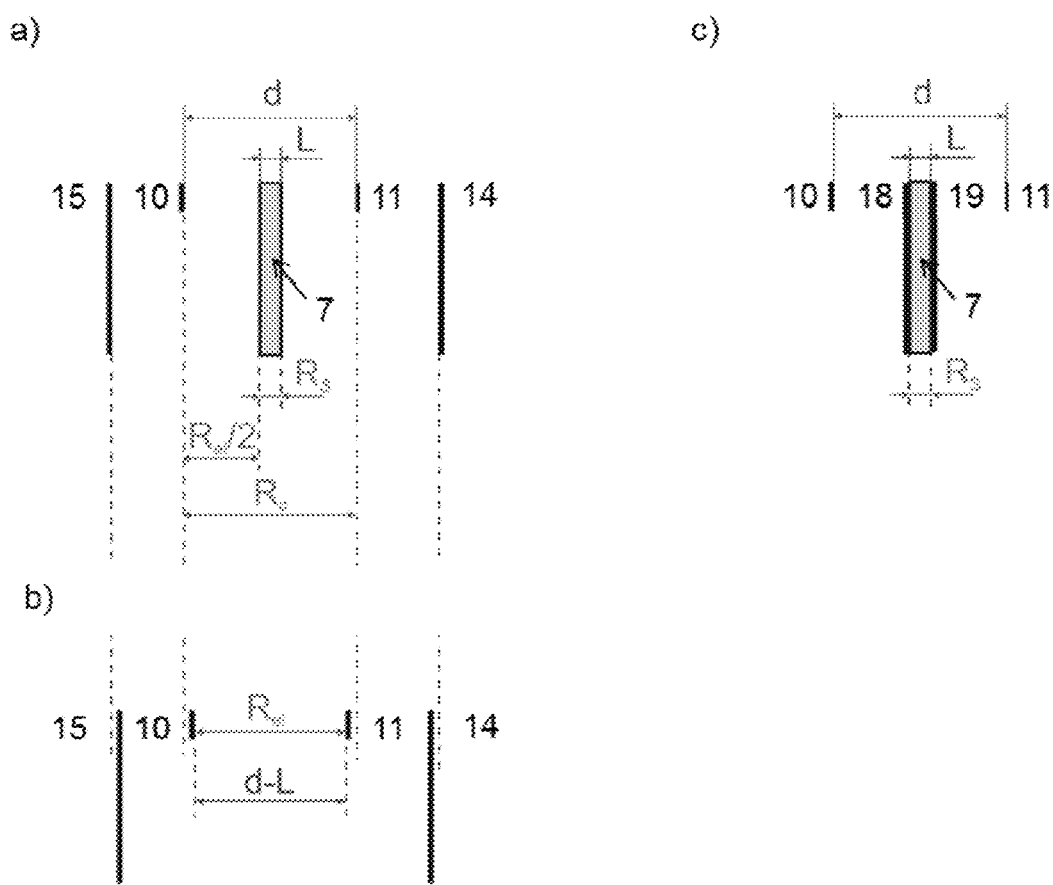
FIG. 8 is a scheme of the determination of the resistance of membranes using: a) and b) non-zero gap and c) zero gap cell set-up.

In the non-zero gap set-up, when a membrane was mounted in the cell, the distance between the anode and cathode was longer due to the thickness of the membrane compared to the distance between the sense and the reference electrode without a mounted membrane. In this case, the electrodes were therefore brought closer to compensate for the membrane thickness (FIG. 8). The non-zero gap cell (FIG. 5) was also used for the measurements of 25 wt. % potassium hydroxide solution conductivity, without the membrane mounted in the cell (FIG. 8). In the zero gap cell set-up (FIG. 6), due to the design thereof, the sense (10) and reference electrode (11) were placed outside of the current lines and their immersion depth did not influence the measured resistance.

Oxygen Permeation Measurements

Certain amounts of generated oxygen flow through the membrane from the anodic to cathodic side. The non-zero gap cell set-up (FIG. 5) enables the monitoring of oxygen which is generated during electrolysis in the anodic compartment, manages to cross the separator and reduces the purity of the produced hydrogen in the cathodic compartment.

In situ measurements of the oxygen cross-over for different separators were undertaken by coupling the chronopotentiometry method, which provides the desired electrolysis regime, with a quadrupole mass spectrometer. A quadrupole mass spectrometer (QMS) capillary was inserted up to 1 cm into the PVC capillary (12) which was fixed to the cathodic compartment for detecting oxygen cross-over. The immersion depth of the sense and reference electrode did not affect the oxygen permeation measurements.

A chronopotentiometry method with a Gamry potentiostat was used to apply a fixed current in order to obtain the desired electrolysis conditions while measuring the oxygen cross-over through the membrane by quadrupole mass spectrometry. The gas permeation measurements were performed at a current density of 160 mA/cm$^2$. At a higher current of 200 mA/cm$^2$, the potassium hydroxide solution was liable to rise up in the PVC capillary and to damage the quadrupole mass spectrometer capillary. All permeation measurements were conducted at a current density of 160 mA/cm$^2$ in order to avoid damaging the capillary, while preserving the measurement accuracy.

During oxygen permeation measurements in the non-zero gap cell, the reference electrode and sense electrode were immersed to within about 5 mm from the bottom of the cell and 70% of the cell volume was filled with the 25 wt. % potassium hydroxide solution. Some trial experiments were performed with the cell filled with more than 70% of electrolyte which resulted in propagation of electrolyte bubbles into the PVC capillary, wherein the quadrupole mass spectrometer capillary was placed, whereby the quadrupole mass spectrometer capillary could be damaged. It is expected that a certain analogy with the industrial condition exists, where the density of the suspension liquid-gas (mixture of the electrolyte and gas bubbles in the separator) is denser at the bottom of the separator and decreases upwardly. Each oxygen permeation measurement was performed at least twice in order to ensure reproducibility.

Without wanting to be bound by theory, it is believed that one reason why the zero gap cell, or more precisely the zero gap cell operating at atmospheric pressure (FIG. 6), is not suitable for the determination of the oxygen permeability, is that in the zero gap set-up at atmospheric pressure, the generated bubbles are significantly big, thus only molecular oxygen dissolved in the electrolyte can cross the separator (7). However, molecular oxygen crossing the separator is readily reduced at the Ni mesh cathode (19) (i.e. O$_2$ is being reduced back to OH$^-$ before reaching the QMS detection capillary placed in the PVC holder (12) attached to the cell opening (22). In the non-zero gap cell (FIG. 5), the QMS detection capillary placed in its PVC holder (12) is situated in-between the separator (7) and the cathode (14). Therefore molecular oxygen reaches the QMS detection capillary before being reduced at the Ni disk cathode. These considerations are set up in detail in Electrochimica Acta 2014, 127, pages 153 to 158.

Hydrogen Permeation Measurements

The cross-over of hydrogen which is generated in the cathodic compartment to the anodic compartment where oxygen is produced, was monitored using the same non-zero gap electrochemical cell, as used for oxygen permeation measurements (FIG. 5), with the exception that the anode and cathode were exchanged, as well as the sense electrode and reference electrode.

Chemical Stability

In order to determine the chemical stability of the precipitation membranes, they were immersed in 25 wt. % potassium hydroxide and 35 wt. % sodium hydroxide for three months prior to a repetition of the resistance and oxygen permeation measurements. This concentration of the potassium hydroxide solution is similar to the potassium hydroxide solutions used in alkaline water electrolysis. The above concentration of the sodium hydroxide solution is similar to the sodium hydroxide concentration in brine electrolysis setups which contain a membrane.

Mechanical Stability

Figure 9:
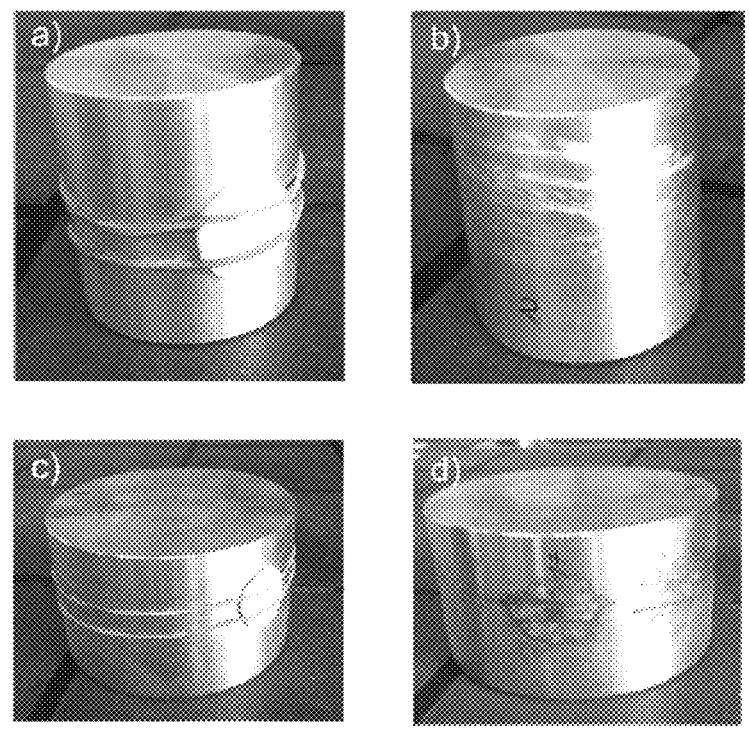
FIG. 9 shows membranes during bending onto cylindrical disks of (a) 50 mm diameter and (b) 100 mm diameter, and the same cylindrical disks after exposure and removal of the membranes of (c) 50 mm diameter and (d) 100 mm diameter.

Mechanical stability of the membranes was assessed by weighing them prior and after bending onto the cylindrical disks of 50 and 100 mm diameter (FIG. 9). After bending, the resistance and oxygen permeation were measured as described in the previous paragraphs.

Influence of the Precipitant Concentrations and the Precipitation Temperature on the Ionic Conductivity and Oxygen Permeation of the Precipitation Membranes The cell shown in FIG. 2 was used for the production of the lab scale precipitation membranes (diameter 20 mm, thickness 2 mm) by varying the precipitant concentrations and precipitation temperatures. Three different H$_2$SO$_4$ and Ba(ClO$_4$)$_2$ precipitant concentrations were 0.01, 0.1 and 0.5 M. The precipitation process was undertaken by pouring simultaneously H$_2$SO$_4$ and Ba(ClO$_4$)$_2$ precipitants solutions of the same concentration. The precipitation using these three chosen concentrations was performed at 8, 22 and 40° C. to assess the influence of the temperature at which the precipitate was formed, on the physical-chemical properties of the resulting separators.

Ionic conductivity (obtained from measured ionic resistance) and oxygen permeability were determined using the zero gap cell set-up (FIG. 6) and the non-zero gap (FIG. 5) cell set-up, respectively, as explained in the previous paragraphs. The solution used for these measurements was also 25 wt. % potassium hydroxide.

All the membranes were preconditioned prior to these measurements by soaking in 25 wt. % KOH electrolyte (6). The electrolyte was poured onto the membrane (7) placed on the ceramic frit (8) and forced through the membrane body by a vacuum pump (9).

Ionic resistance of the separators was measured approximately three weeks after the immersion, while for oxygen permeability measurements the immersion duration was not strictly monitored, as the results of our previous work showed that the immersion duration influenced the resistance, but not the oxygen permeability.

XRD measurements were conducted on the $BaSO_4$ powder obtained by mixing precipitant solutions of three molarities outside of the PPS matrix. The temperature of these solutions was adjusted to 8, 22 or 40° C. before the precipitation. The $BaSO_4$ powder precipitation process itself was, in analogy to separator preparations, undertaken at these three temperatures. As well, XRD measurements were conducted on the separators formed by precipitating $BaSO_4$ into the PPS matrix. X-Ray diffraction software XPowder 12 vers. 04.10 was used for the XRD spectra analysis. The morphology of the separators formed by precipitating $BaSO_4$ into the PPS matrix was assessed by Scanning Electron Microscopy (SEM).

Characterization Results

Resistance Measurements

In order to calculate the cell constant K (Table I), the resistance $R_{st}$ of two standard electrolytes, 0.1 M KCl and 1 M KCl, of known conductivity $k_{st}$, was measured using the non-zero gap four-electrode cell shown in FIG. 5. The average value of the cell constant was $K_{average}=1.38\pm0.03$ $cm^{-1}$.

$$K=k_{st}R_{st} \quad (1)$$

TABLE I

Measured standard solution resistance $R_{st}$ in the non-zero gap cell at open circuit potential (OCP), known standard solution conductivity $\kappa_{st}$ and calculated cell constant K.

| | $R_{st}$ [Ω] | $\kappa_{st}$ [mS cm$^{-1}$] | K [cm$^{-1}$] |
|---|---|---|---|
| 0.1M KCl | 107.18 | 12.85 | 1.38 |
| | 106.22 | | 1.36 |
| | 106.79 | | 1.37 |
| 1M KCl | 12.94 | 111.30 | 1.44 |
| | 12.14 | | 1.35 |
| | 14.41 | | 1.38 |

Electrolyte resistance $R_{el}$ was measured using the same non-zero gap electrochemical cell (FIG. 5). The ionic conductivity of the 25 wt. % potassium hydroxide (5.5 M potassium hydroxide) electrolyte was calculated as follows:

$$k = \frac{K}{R_{el}} \quad (2)$$

Figure 10:
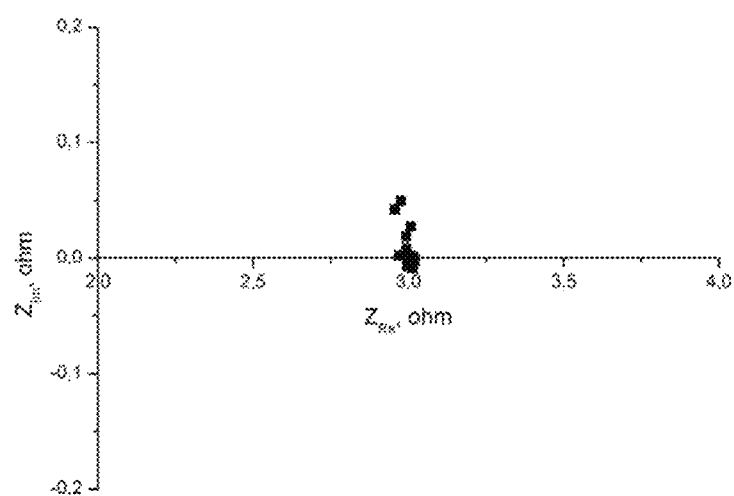
FIG. 10 shows a typical electrochemical impedance spectroscopy spectrum obtained during the resistance measurements (asbestos separator, 160 mA/cm$^2$) in a non-zero gap cell.

The performed electrochemical impedance spectroscopy in both non-zero gap and zero gap set-up measurements were used for the determination of the cell impedance Z:

$$Z=Z_{Re}+jZ_{Im} \quad (3)$$

where Z is the complex impedance, with $Z_{Re}$ and $Z_{Im}$ the real and imaginary parts of the complex impedance, respectively. The imaginary part of the complex impedance for all performed measurements lies in the milliohm range and can be neglected compared to the real part of impedance lying in the ohm range. Therefore, the measured $Z_{Re}$ represents the cell resistance $R_c$ (FIG. 10).

Knowing the values of $R_c$ and $R_{el}$, the membrane resistance $R_M$ for the non-zero gap set-up (FIG. 5 and FIG. 8a, FIG. 8b) can be calculated:

$$R_M=R_c-R_{el} \quad (4)$$

In the zero gap cell (FIG. 6), the separator resistance determination is simplified (FIG. 8c), because the measured cell resistance corresponds directly to the separator resistance and may be determined as follows:

$$R_M=R_c \quad (5)$$

Subsequently, the conductivity of the membranes $k_M$ was calculated using the following equation:

$$k_M = \frac{L}{R_M A} \quad (6)$$

where L is the thickness of the membrane, and A is the surface of the membrane exposed to the electrolyte (2.54 $mm^2$ after installment in the cell with O-rings). Table II gives an overview of the conductivities of pure polyphenylene sulfide, polyphenylene sulfide with $BaSO_4$, asbestos and the electrolyte itself determined using the non-zero gap cell set-ups.

TABLE II

Calculated solution and membrane conductivity, κ, for resistance measurements performed in the non-zero gap cell at open circuit potential (OCP) in potassium hydroxide solution.

| | κ, mS cm$^{-1}$ | | |
|---|---|---|---|
| | 160 mA/cm$^2$ | | 200 mA/cm$^2$ |
| immersion duration | 0 month | 3 months | 1 month |
| no membrane | 688 ± 10 | | 670 ± 19 |
| PPS | 280 ± 60 | 254 ± 56 | 439 ± 110 |
| PPS + $BaSO_4$ | 232 ± 40 | 358 ± 47 | 349 ± 60 |
| Asbestos | 162 ± 20 | 281 | 179 ± 30 |

After the short term immersion measurements, polyphenylene sulfide and polyphenylene sulfide with $BaSO_4$ samples were removed from the cell and placed in sealed plastic tubes which were filled with 20 ml of 25 wt. % potassium hydroxide solution. The samples were kept in these tubes containing the potassium hydroxide solution for three months in order to investigate the long term immersion effect on conductivity and gas permeation. Asbestos samples were wetted with potassium hydroxide solution during the measurement and were thereafter removed from the cell. Immersion of asbestos samples in the potassium hydroxide solution for three months would have led to structural degradation. The asbestos samples were therefore kept wet in a plastic tube without further addition of potassium hydroxide solution.

Figure 11:
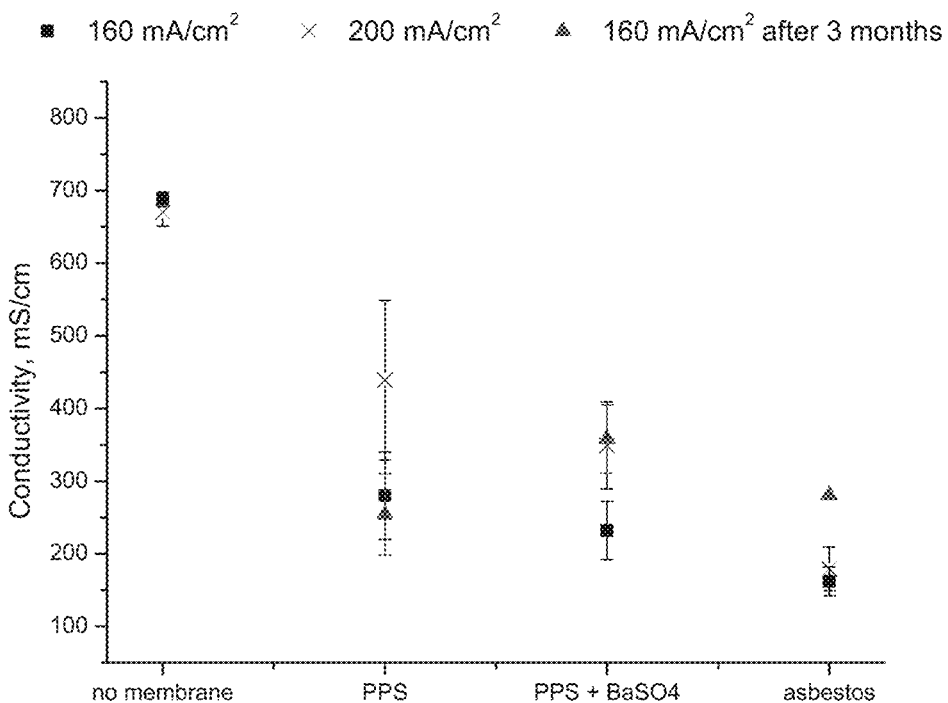
FIG. 11 shows the influence of current density and immersion duration on the conductivity of different membranes using a non-zero gap cell set-up.

The conductivity of precipitation membranes and pure polyphenylene sulfide was similar, which indicates that no additional voltage drop leading to increased energy consumption would be encountered when using the precipitation membranes in alkaline water electrolyzers. Without wanting to be bound by theory, we believe that the higher conductivities of polyphenylene sulfide and polyphenylene sulfide with $BaSO_4$ at 200 mA/cm$^2$ are due to longer immersion of the samples in the potassium hydroxide prior to measurements compared to measurements that were undertaken at 160 mA/cm$^2$ (FIG. 11). The influence of immersion duration is equally pronounced for asbestos sample and for polyphenylene sulfide with $BaSO_4$. It does not appear that the higher current can influence the ionic conductivity because higher current in our measurements did not influence the conductivity of pure electrolyte or asbestos samples.

Taking into account that the zero gap cell set-up (FIG. 6) provided simpler determination of resistance and better measurements reproducibility, further resistance measurements were conducted using only zero-gap set-up (FIG. 6). Additionally, state-of-the-art Zirfon Perl® membranes were characterized. They were conditioned as shown in FIG. 4 and placed in sealed plastic tubes which were filled with 20 ml of 25 wt. % potassium hydroxide solution prior to measurements.

Additional testing in a Mini Test Cell (120 cm² active area) was conducted to determine the voltage drop at 80° C. when applying current densities of 2 kA/m² (200 mA/cm²) and 6 kA/m² (600 mA/cm²), such as are used in industrial scale electrolysis cells. The thickness of the membrane according to the present invention was about 2 mm and the thickness of the Zirfon Perl®-membrane was 0.5 mm. It was found that the voltage drop observed with the membrane according to the present invention and with the Zirfon Perl®-membrane was similar, despite the considerable difference in thickness (cf. FIG. 22). This indicates a significantly improved ionic conductivity of the membranes according to the present invention as compared to Zirfon Perl®-membranes. The application of the membranes according to the present invention in alkaline water electrolyzer cells on industrial scale with membrane surfaces of, for example, 2.7 m² are feasible.

The measured cell voltage with the membrane according to the present invention was 2.07 V at 6 kA/m². Furthermore, the k-Factors, which represent a slope of the curve in FIG. 22 (linear fit), of 2 mm thick membranes according to the present invention were determined in solutions of 30 wt.-% aqueous KOH and 20% wt.-% aqueous NaOH. The values obtained were 0.07 to 0.08 V/(kA/m²) and 0.085 to 0.095 V/(kA/m²), respectively. It is estimated that the k-Factor for a corresponding membrane of 1 mm thickness would be 0.035 V/(kA/m²). The lab scale ionic conductivity result with the membrane according to the present invention is 276 mS/cm (after three weeks immersion), which gives the resulting k-factor of 0.073 V/(kA/m²), confirming a very good agreement with the industrial prototype testing (0.07 to 0.08 V/(kA/m²)).

Figure 22:
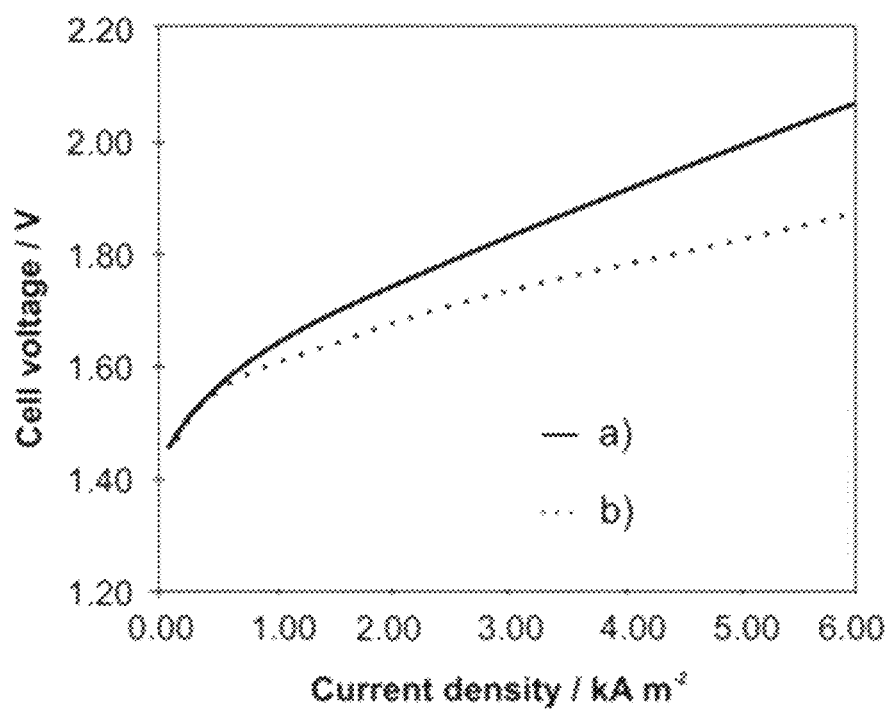
FIG. 22 shows cell voltage vs. current density measured under industrial conditions (ambient pressure, 80° C.) for a membrane according the present invention (BaSO$_4$ precipitated on PPS having a thickness of 2 to 3 mm, prepared using 0.1 M precipitant concentrations at ambient temperature); cathode material: Typ v6 with NRGr-coating; anode material: expanded metal Ni, sandblasted. a) Membrane according to the present invention having a thickness of 2 mm, 30 wt. % KOH; b) Membrane according to the present invention having a thickness of 1 mm (estimated, fit with k=0.035).

The ionic conductivity of a PPS with PTFE separator supplied by Gore is not given in FIG. 22 due to extremely low value (conductivity equals to 27±12 mS cm⁻¹).

Oxygen Permeation

Figure 12:
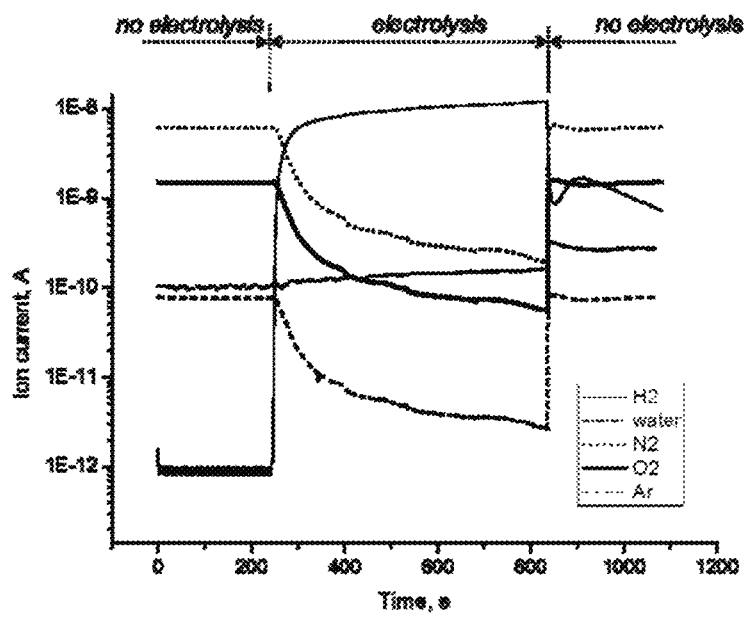
FIG. 12 shows typical values obtained by oxygen permeation detection measurement with a quadrupole mass spectrometer (polyphenylene sulfide separator, 160 mA/cm$^2$) using a non-zero gap cell set-up.

The oxygen permeation measurements performed in the non-zero gap cell set-up were based on monitoring the ion current of hydrogen, water, nitrogen, oxygen and argon before, during and after the electrolysis took place. A typical example of quadrupole mass spectrometry results of ionic current which were obtained before, during and after electrolysis for hydrogen, water, nitrogen, oxygen and argon are shown in FIG. 12.

When no membrane was installed in the cell during electrolysis, the oxygen from anodic compartment could unimpededly approach the quadrupole mass spectrometer capillary, the ion current increased slightly and the hydrogen ion current increased significantly. On the other hand, the ion current for $N_2$ which represents the air decreased. The precipitation membrane installed in the cell led to a more pronounced drop of oxygen ion current compared to pure polyphenylene sulfide, which indicates the difference in oxygen permeation properties of these membranes.

With the polyphenylene sulfide membrane installed, a smaller amount of oxygen produced during electrolysis arrived in the cathodic compartment and was detected by quadrupole mass spectrometer capillary. The drop in the ion current comes from the hydrogen pressure which is generated close to the quadrupole mass spectrometer capillary. However the plots of the oxygen and nitrogen ion currents show a clear difference in oxygen permeation when no membrane is installed or when a polyphenylene sulfide membrane, a polyphenylene sulfide $BaSO_4$ precipitation membrane or asbestos were installed.

Figure 13:
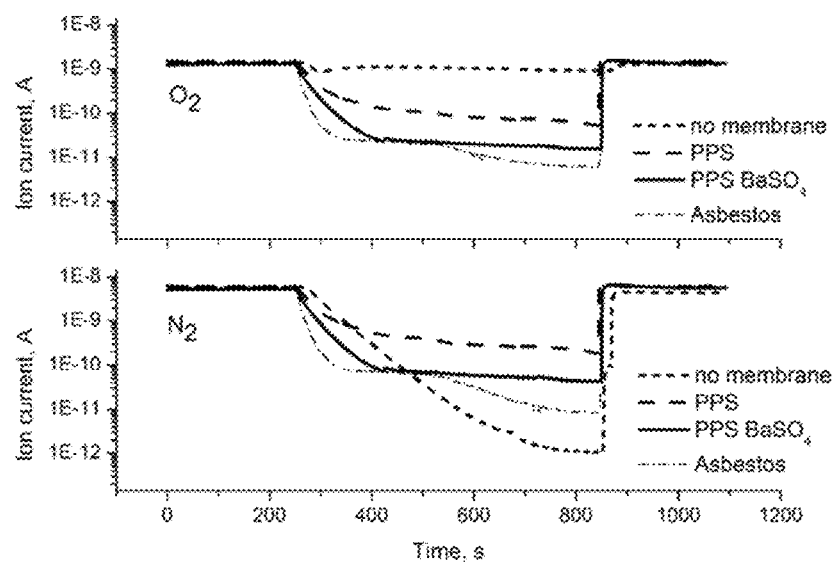
FIG. 13 shows quadrupole mass spectrometry spectra for different membranes using a non-zero gap cell set-up.

The behavior of a polyphenylene sulfide $BaSO_4$ precipitation membrane is similar to asbestos when the electrolysis starts, while their anodic currents differ at a later stage of the electrolysis (FIG. 13).

Quantification of Oxygen Permeation Across Different Membranes

In order to quantify the partial pressure of oxygen, $y_{O2}^{ELS}$ [atm] which was generated during electrolysis in the anodic compartment, crossed the membrane and was then measured by quadrupole mass spectrometer in the cathodic compartment, the oxygen ionic current measured just before electrolysis stopped, $j_{32}^{ELS}$ [A] was defined as follows:

$$j_{32}^{ELS} = y_{O_2}^{ELS} S_{32,O_2} + y_{air} S_{32,air} \quad (7)$$

wherein $S_{32,O2}$ [A/atm] is the sensitivity factor of $O_2$, $S_{32,air}$ [A/atm] is the sensitivity factor of $O_2$.

The partial pressure of air in the hydrogen stream, $y_{air}$ [atm], can be expressed by the following equation:

$$y_{air} = \frac{j_{28}^{ELS}}{j_{28}^{air}} \quad (8)$$

wherein $j_{28}^{ELS}$ [A] is the nitrogen ionic current measured just before electrolysis stopped, and $j_{28}^{air}$ [A] is the nitrogen ionic current measured before electrolysis started.

The sensitivity factor of $O_2$ in air, $S_{32,air}$ [A/atm], is equal to $j_{32}^{air}$ [A] i.e. the $O_2$ ionic current in air:

$$j_{32}^{air} = S_{32,air} \quad (9)$$

Oxygen ionic current in air can be also expressed as:

$$j_{32}^{air} = 0.2 S_{32,O_2} \quad (10)$$

where $S_{32,O2}$ is the sensitivity factor of $O_2$, A/atm.

By incorporating Equations (8-10) into Equation (7), the partial pressure of oxygen $y_{O2}^{ELS}$ [atm] which was generated during electrolysis in the anodic compartment, crossed the membrane and was then measured by quadrupole mass spectrometer in the cathodic compartment can be calculated as follows:

$$y_{O_2}^{ELS} = y_{O_2}^{air}\left(\frac{j_{32}^{ELS}}{j_{32}^{air}} - \frac{j_{28}^{ELS}}{j_{28}^{air}}\right) = 0.2\left(\frac{j_{32}^{ELS}}{j_{32}^{air}} - \frac{j_{28}^{ELS}}{j_{28}^{air}}\right) \quad (11)$$

For the quantification of the oxygen permeation, the ionic current values of oxygen and hydrogen before the electrolysis started and just before the electrolysis stopped were extracted from the quadrupole mass spectrometer spectra (FIG. 13) for each measurement.

Figure 14:
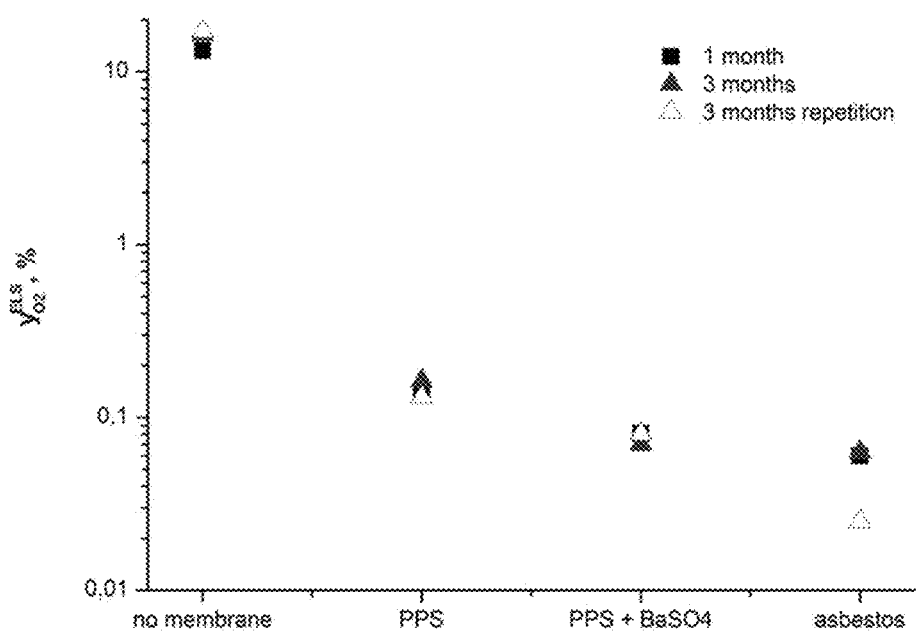
FIG. 14 shows the influence of the duration of exposure of membranes to 25 wt. % potassium hydroxide solution prior to measurements on the percentage of oxygen in the cathodic compartment which has permeated across the respective membranes during electrolysis in 25 wt. % potassium hydroxide using a non-zero gap cell set-up.

These measurements were performed at atmospheric pressure. Accordingly, when multiplying the results calculated using Equation (11) by 100, the percentage of oxygen crossing the membrane was obtained (FIG. 14).

The values of oxygen cross-over when a polyphenylene sulfide membrane with $BaSO_4$ was used, were closer to asbestos membrane cross-over, which means that $BaSO_4$ improves significantly the oxygen gas tightness of pure polyphenylene sulfide. The values are shown for samples measured after 1 month of immersion in potassium hydroxide and after a long term immersion of three months in this electrolyte.

Longer exposure to potassium hydroxide does not influence significantly the permeation properties of the samples. Higher scattering was observed with the asbestos sample, probably because of structural degradation of asbestos after 3 months immersion in potassium hydroxide.

The permeation values for polyphenylene sulfide membranes with $BaSO_4$ and asbestos differed by about 20% if the last very low value for asbestos is not taken into account. On the other hand, the permeation value of the polyphenylene sulfide membrane with $BaSO_4$ was about half of the permeation value of the pure polyphenylene sulfide membrane.

Figure 15:
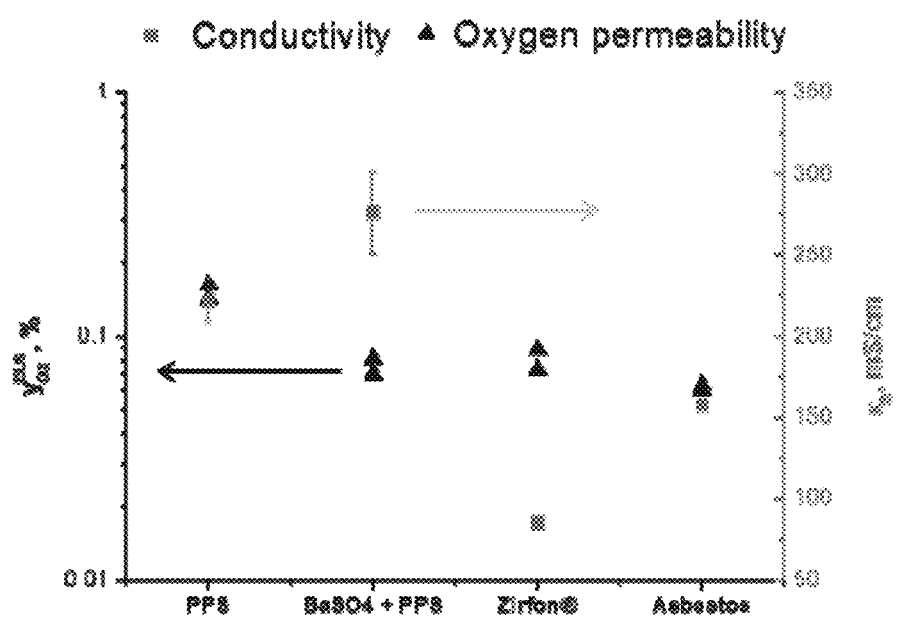
FIG. 15 shows the ionic conductivity determined using a zero gap cell set-up (after three weeks immersion) and oxygen permeability determined using a non-zero gap cell set-up for polyphenylene sulfide (PPS), PPS with BaSO$_4$, Zirfon Perl® and asbestos.

The results shown in FIG. 15 indicate that environmentally friendly separator materials of the present invention (PPS with $BaSO_4$, precipitants concentrations 0.1M, precipitation temperature 22° C.) possess comparable gas tightness to Zirfon Perl® and asbestos, yet surpass their ionic conductivity. The results refer to a short term immersion. The ionic conductivity was calculated using the resistance values obtained in the zero gap cell set-up (ZG), while the oxygen permeation was determined using the non-zero gap cell set-up.

Additional testing was conducted to determine the voltage drop at 80° C. when applying current densities of 2 $kA/m^2$ and 6 $kA/m^2$, such as are in industrial scale electrolysis cells. The thickness of the membrane according to the present invention was about 2 mm and the thickness of the Zirfon Perl®-membrane was 0.5 mm. It was found that the oxygen permeation observed with the membrane according to the present invention and with the Zirfon Perl®-membrane was similar, i.e. the concentration of $O_2$ in $H_2$ was about 0.2 vol.-% at 6 $kA/m^2$ and about 0.6 volume-% at 2 $kA/m^2$. The measured $O_2$ in $H_2$ at 160 $mA/cm^2$ (1.6 $kA/m^2$) in laboratory conditions was equal to 0.08 vol.-%. The application of the membranes according to the present invention in alkaline water electrolyzer cells on industrial scale with membrane surfaces of, for example, 2.7 $m^2$ are feasible.

Hydrogen Permeation

Figure 16:
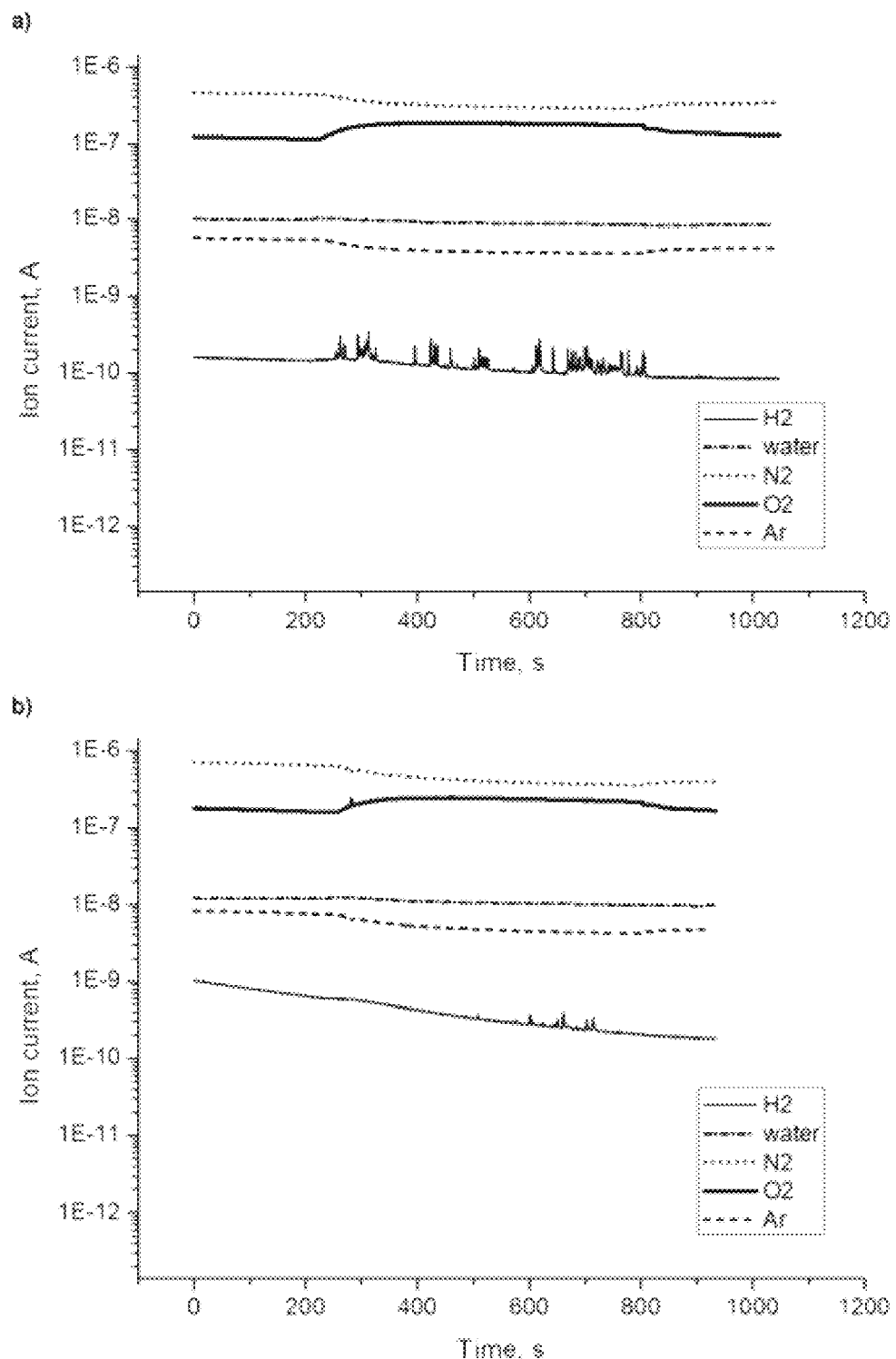
FIG. 16 shows data concerning the hydrogen permeation detection by quadrupole mass spectrometry in the oxygen generation compartment of the non-zero gap cell set-up: a) and b) first sample of polyphenylene sulfide with BaSO$_4$, with repetition, c) and d) second sample polyphenylene sulfide with BaSO$_4$ with repetition, e) and f) without membrane.
Figure 16:
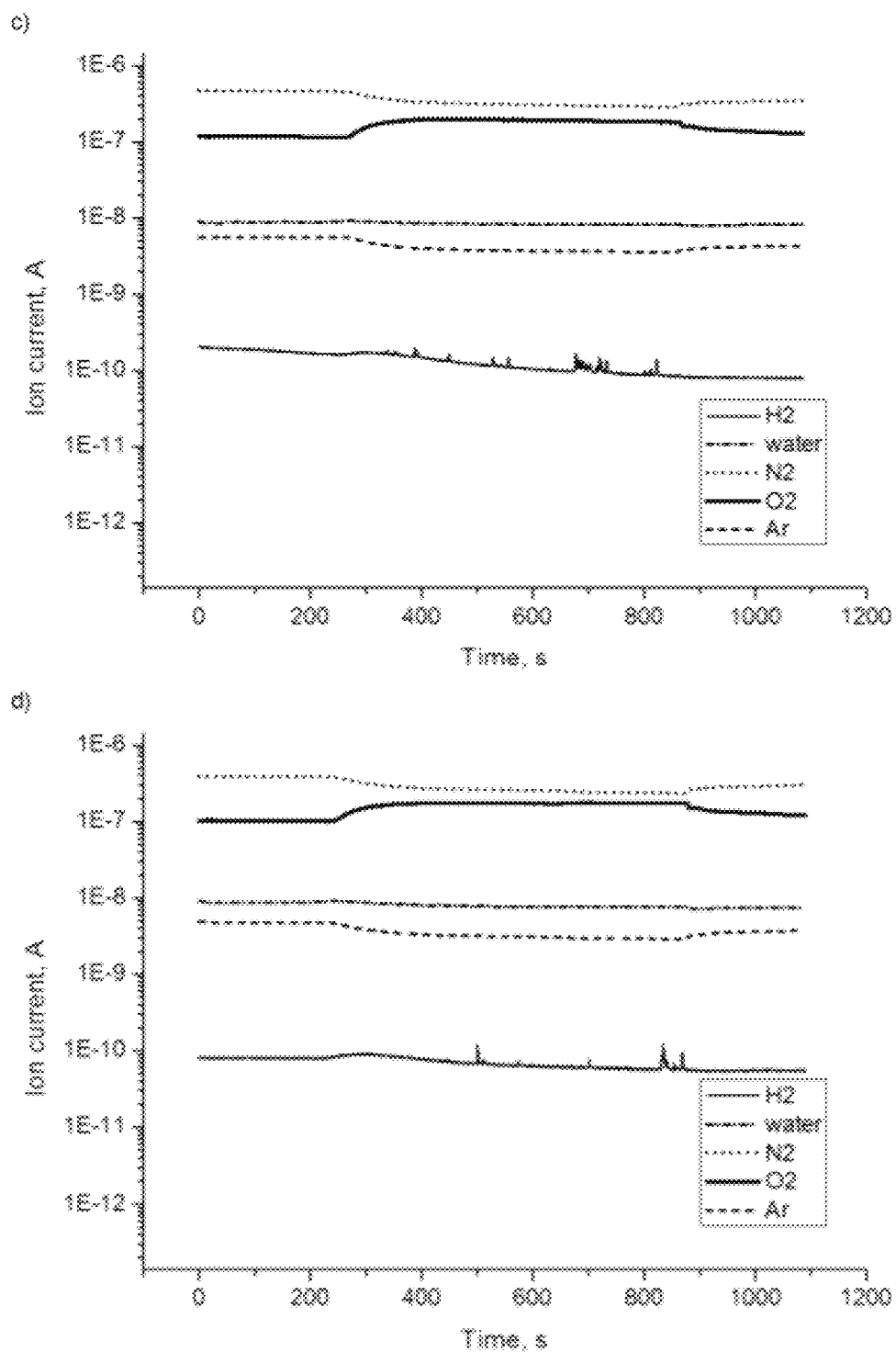
Figure 16:
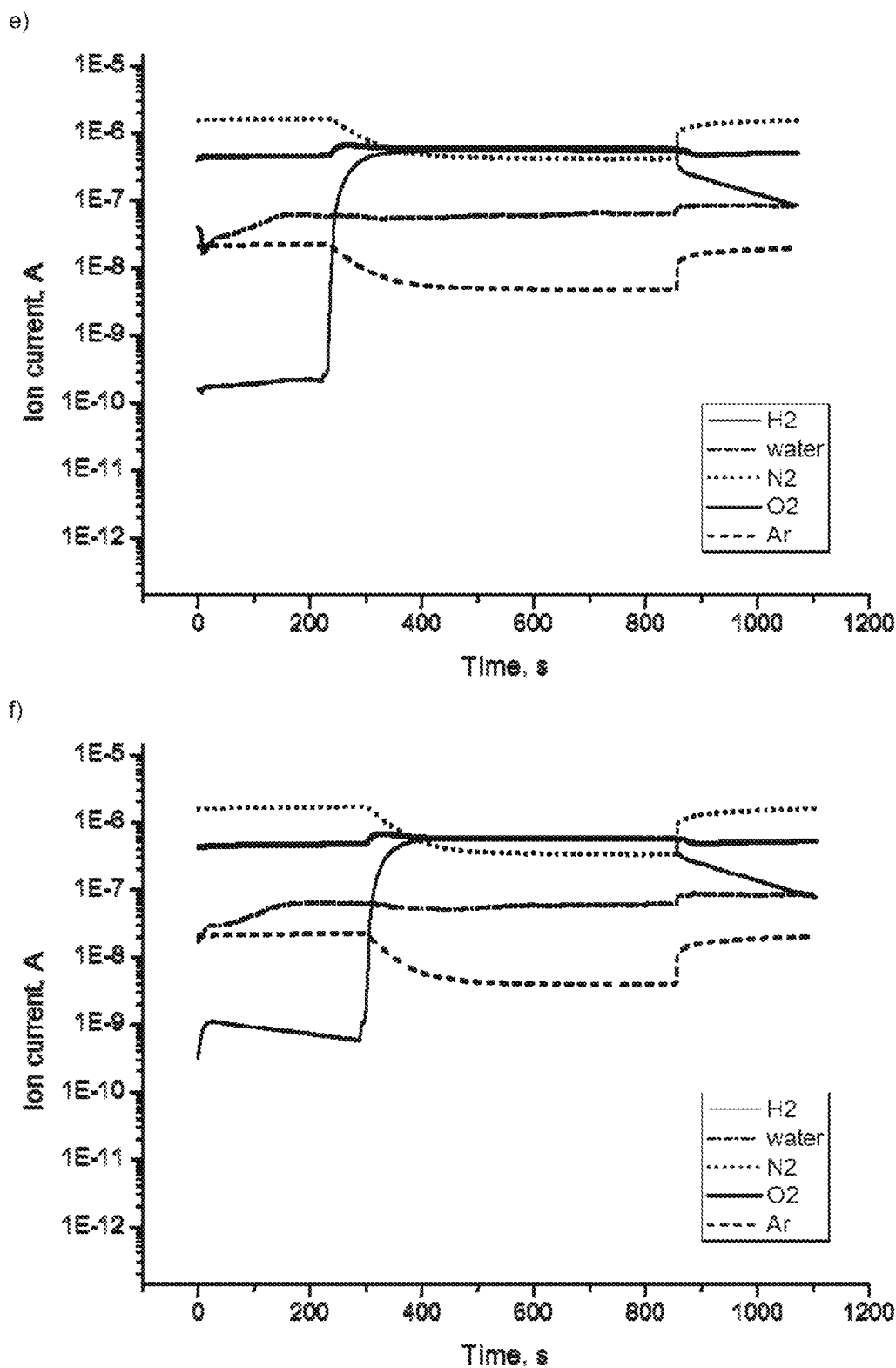
Figure 17:
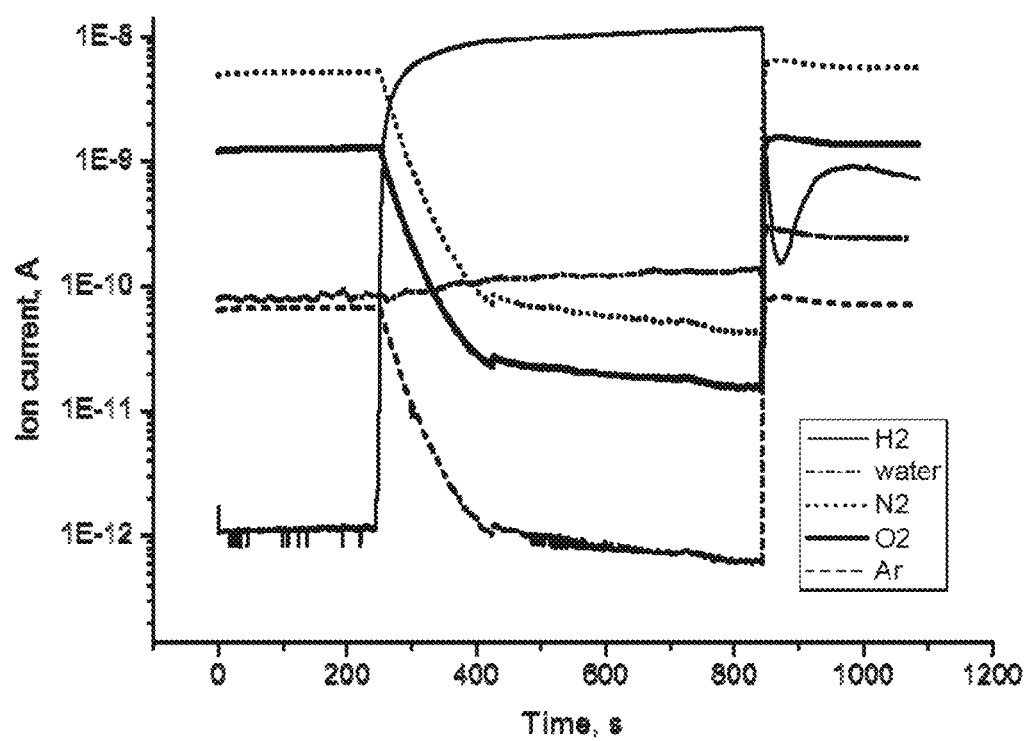
FIG. 17 shows values for the hydrogen permeation detection by quadrupole mass spectrometry in the hydrogen generation compartment of the non-zero gap cell set-up when using polyphenylene sulfide membrane containing BaSO$_4$.

Ionic currents measured in the cell set-up for hydrogen permeation measurements are given in FIG. 16a)-d) for samples using a membrane of polyphenylene sulfide with $BaSO_4$ and in FIG. 16e)-f) for samples without a membrane. The amount of hydrogen produced during electrolysis in the cathodic compartment which crossed the membrane and was detected in the anodic compartment, where the hydrogen permeation measurements quadrupole mass spectrometer capillary was placed, was lower than the lower detection limit as shown in FIG. 16a)-d)). The ionic current of hydrogen was in the range of $10^{-10}$ A before and during electrolysis.

Hydrogen ionic current measured in the oxygen compartment without a membrane (FIG. 16e)-f)) rose from the range of $10^{-10}$ A before electrolysis to $10^{-6}$-$10^{-7}$ A during electrolysis. This indicates that the system is in principle able to detect a change and a low amount of hydrogen penetrating the membrane.

On the other hand, hydrogen ionic current measured in the hydrogen compartment rose from the range of $10^{-10}$ A before electrolysis to $10^{-6}$ to $10^{-7}$ A during electrolysis (FIG. 16), which results in a calculated hydrogen detectability limit of 0.01% using the following equation:

$$y_{H2}^{ELS} = \frac{j_2^{air}}{j_2^{ELS}} \quad (12)$$

where $y_{H2}^{ELS}$ [%] is the partial pressure of hydrogen in hydrogen compartment, $j_2^{air}$ [A] is the hydrogen ionic current measured in hydrogen compartment before electrolysis started and $j_2^{ELS}$ [A] is the hydrogen ionic current measured in hydrogen compartment just before electrolysis stopped.

It can therefore be concluded that the mixing of hydrogen and oxygen is prevented when using polyphenylene sulfide membranes with $BaSO_4$, because the crossover of hydrogen according to FIG. 16a)-d) is far below 0.01%.

Chemical Stability

In order to determine the chemical stability of the precipitation membranes, the samples of polyphenylene sulfide, polyphenylene sulfide with $BaSO_4$ and asbestos were immersed in 25 wt.-% potassium hydroxide solutions and the resistance (Table II) and permeation (FIG. 14) were measured after 3 months of immersion.

Figure 18:
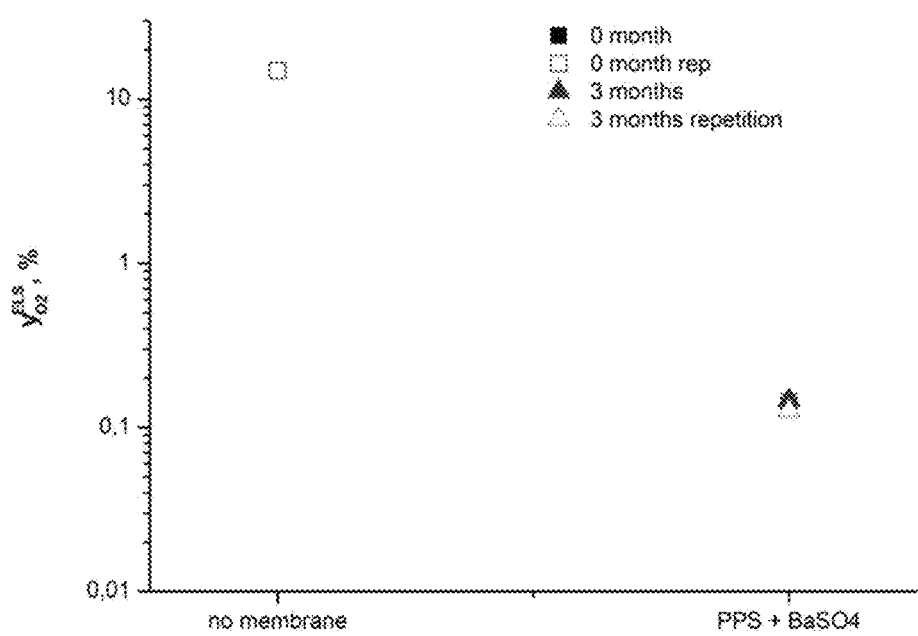
FIG. 18 shows the percentage of oxygen in the cathodic compartment which has permeated via a polyphenylene sulfide membrane containing BaSO$_4$ during electrolysis in the non-zero gap cell set-up in a 35 wt. % sodium hydroxide aqueous solution.

Polyphenylene sulfide with $BaSO_4$ samples were also exposed to long term, i.e. three months, immersion in 35 wt. % sodium hydroxide, i.e. corresponding to its concentration in brine electrolysis cells of membrane type, prior to resistance and oxygen permeation measurements and compared to values obtained for short time immersion (Table III, Table IV, FIG. 18). The conductivities which were calculated as the average of three measurements after short term immersion (less than one week) were about 184 mS/cm and 20 mS/cm for electrolysis in 35 wt. % sodium hydroxide when using no membrane or the polyphenylene sulfide membrane with $BaSO_4$ in this solution, respectively. The conductivity of this membrane measured after long term immersion was about 20 mS/cm, which indicates that the immersion duration did not significantly affect the conductivity (Table III). Immersion of polyphenylene sulfide membranes with precipitated $BaSO_4$ in potassium hydroxide solution had a significant influence on the conductivity of the membranes, while the effect of immersion duration in sodium hydroxide solution was negligible (Table II and III).

TABLE III

Calculated solution and membrane conductivity, k, for resistance measurements performed in the non-zero gap cell at open circuit potential in sodium hydroxide solution

| | κ, mS cm$^{-1}$ 160 mA/cm$^2$ | |
|---|---|---|
| | 0 month immersion | 3 months immersion |
| no membrane | 184 ± 13 | |
| PPS + $BaSO_4$ | 20 ± 6 | 20 ± 3 |

A summary of oxygen permeation values in percent is given in Table IV for both potassium hydroxide and sodium hydroxide solutions. Oxygen permeation did not change after long term immersion in either of these electrolytes (Table IV).

TABLE IV

Percentage of oxygen permeation, $y_{O2}^{ELS}$, across membranes during electrolysis in the non-zero gap cell in 25 wt. % potassium hydroxide and 35 wt. % sodium hydroxide, at 160 mA/cm$^2$

| | $y_{O2}^{ELS}$, % | | | |
|---|---|---|---|---|
| | 25 wt. % potassium hydroxide | | 35 wt. % sodium hydroxide | |
| Immersion time | 1 month | 3 months | 0 months | 3 months |
| no membrane | 13.260 | 16.460 | 14.990 | |
| | | 17.156 | 14.943 | |
| PPS | 0.143 | 0.163 | | |
| | | 0.131 | | |
| PPS + BaSO$_4$ | 0.081 | 0.070 | 0.135 | 0.147 |
| | | 0.080 | 0.142 | 0.127 |
| Asbestos | 0.060 | 0.063 | | |
| | | 0.025 | | |

Mechanical Stability

Mechanical stability of the polyphenylene sulfide with BaSO$_4$ membranes was assessed by weighing them prior and after bending onto a cylindrical aluminum disc of 50 mm diameter and onto a cylindrical copper disc of 100 mm diameter. The samples were attached to the cylindrical discs using rubber bands, as shown in FIG. 9. The pressure of the rubber band onto the samples was higher in the case of the bigger cylinder, because the same band (same elasticity) was used for both cylinder sizes. After 24 h of bending, the resistance and oxygen permeation were measured (Table VI). Even though the samples were dry when attached to the cylinders, a reaction trace was observed on the copper cylinder after bending (FIG. 9d). The samples subjected to bending tests were stored in potassium hydroxide for about 3 months, and dried in an oven at 60° C. prior to bending.

TABLE V

Weight, m, of BaSO$_4$ membranes before and after bending onto metallic cylinder

| | m, mg | |
|---|---|---|
| | before bending | after bending |
| 50 mm cylinder | 261.13 | 258.67 |
| | 262.20 | 253.80 |
| 100 mm cylinder | 264.13 | 259.70 |
| | 320.75 | 318.60 |

TABLE VI

Conductivity, κ, and oxygen permeation, $y_{O2}^{ELS}$, during electrolysis in the non-zero gap cell in 25 wt. % potassium hydroxide at 160 mA/cm$^2$

| | κ, mS cm$^{-1}$ | | $y_{O2}^{ELS}$, % | |
|---|---|---|---|---|
| | before bending | after bending | before bending | after bending |
| 50 mm cylinder | 232 ± 40 | 488 | 0.081 | 0.087 |
| | | 432 | | 0.088 |
| 100 mm cylinder | | 384 | | 0.114 |
| | | 337 | | 0.088 |

Prior to and after bending onto the metallic cylinders, the membranes were weighed and a weight reduction of about 2 to 9 mg was detected for both cylinders (Table V).

The conductivity of bent samples lies in-between the values of not bent samples immersed for a short (232 mS cm$^{-1}$, Table II, Table VI) and long term (716 mS cm$^{-1}$) in potassium hydroxide (Table II). Without wanting to be bound by theory, we believe that immersion duration and wettability have a more significant influence on the conductivity than the mechanical treatment (bending). The wettability of the bent samples differs from both the samples which were immersed for a short or a long time in potassium hydroxide, but can be considered closer to the samples which were immersed for a short time in potassium hydroxide and the conductivity results should therefore be compared to conductivities and oxygen permeation of the samples which were immersed for a short term (Table VI).

Bending leads to a significant increase of conductivity, while the oxygen permeation of the bent polyphenylene sulfide with BaSO$_4$ samples remains low. Oxygen permeation after bending onto the 50 mm cylinder increased by about 12%, while the bending onto the bigger cylinder (accompanied with the higher rubber band pressure) influenced the increase of oxygen permeation by about 30%, compared to non-bent polyphenylene sulfide with BaSO$_4$ samples immersed for short or long term in potassium hydroxide (Tables V and VII).

Figure 19:
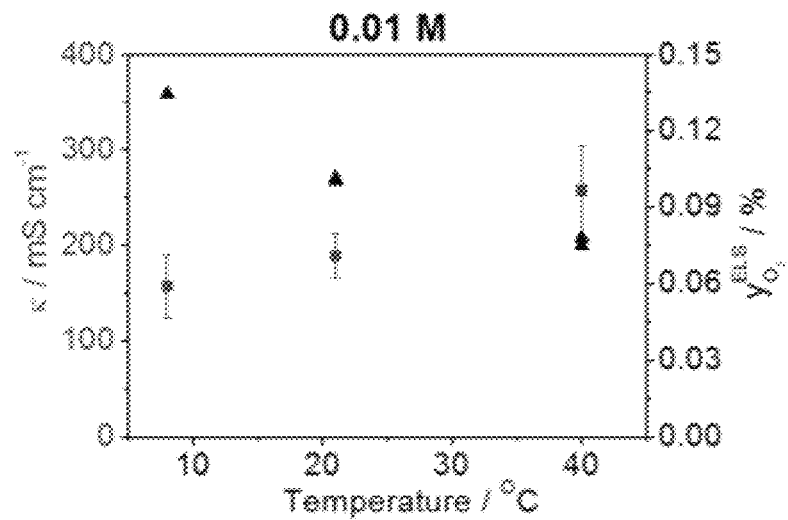
FIG. 19 shows the influence of temperature on the ionic conductivity (determined using a zero gap cell set-up) and oxygen permeability (determined using a non-zero gap cell set-up) of separators produced using different precipitant concentrations: a) 0.01 M, b) 0.1 M, and c) 0.5 M (precipitants: Ba(ClO$_4$)$_2$ and H$_2$SO$_4$ solutions).
Figure 19:
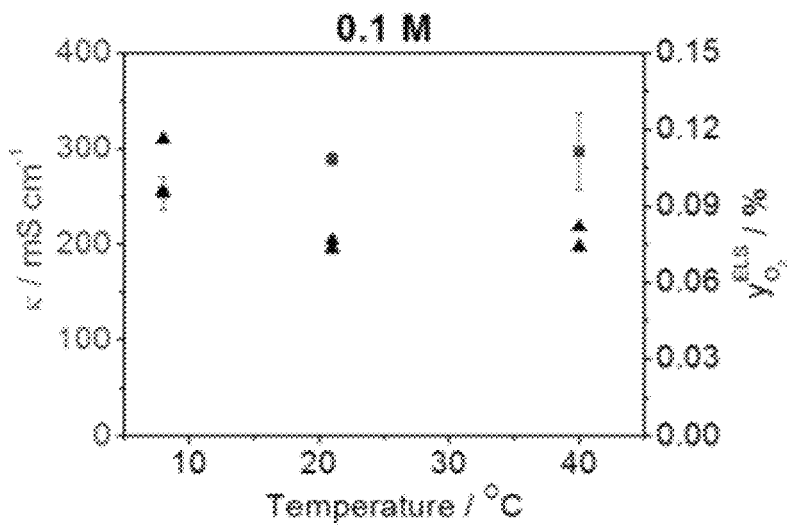
Figure 19:
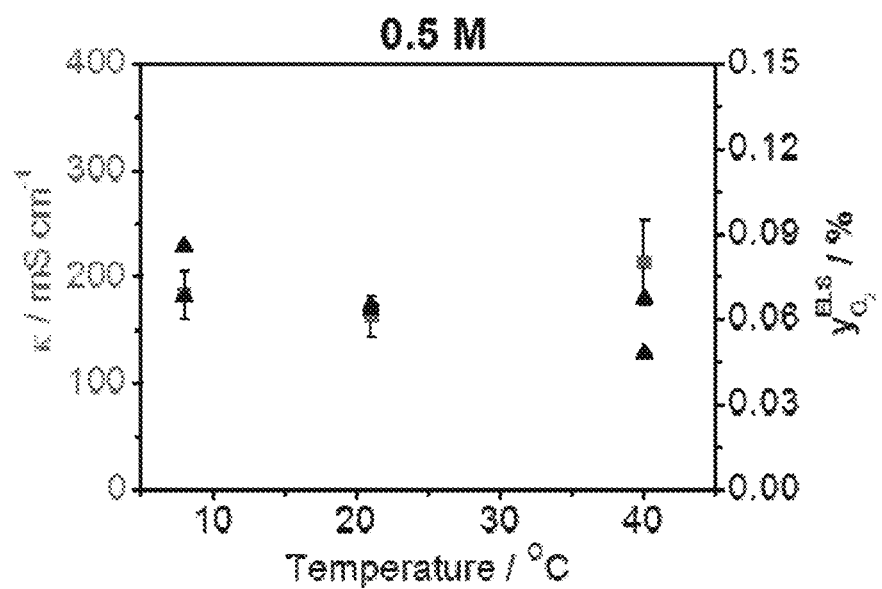

Influence of the Precipitant Concentration and the Precipitation Temperature on the Ionic Conductivity and Oxygen Permeation of the Precipitation Membranes Ionic conductivity increase and oxygen permeability decrease are the desired (though contradicting) properties for a separator to fulfill. FIG. 19a shows the desired trends when increasing the temperature for 0.01 M precipitant concentration. The optimal values of ionic conductivity simultaneously achieved with low oxygen permeability are observed for 0.1 M precipitant concentration at 22 and 40° C. (FIG. 19b).

The half-width at full maximum value (HWFM) has been determined by XPowder 12 software for peaks 021, 121 and 002 of the XRD spectra, enabling the calculation of the crystallite size using Scherer formula. The HWFM for powder samples (FIG. 20a) was determined without background subtraction, while for the BaSO$_4$ crystals precipitated onto the PPS matrix (FIG. 20b), the background subtraction (auto roller, flat roller, 2.0) was performed due to insufficient quantity of BaSO$_4$ available for detection compared to the pure powder BaSO$_4$ samples.

Figure 20:
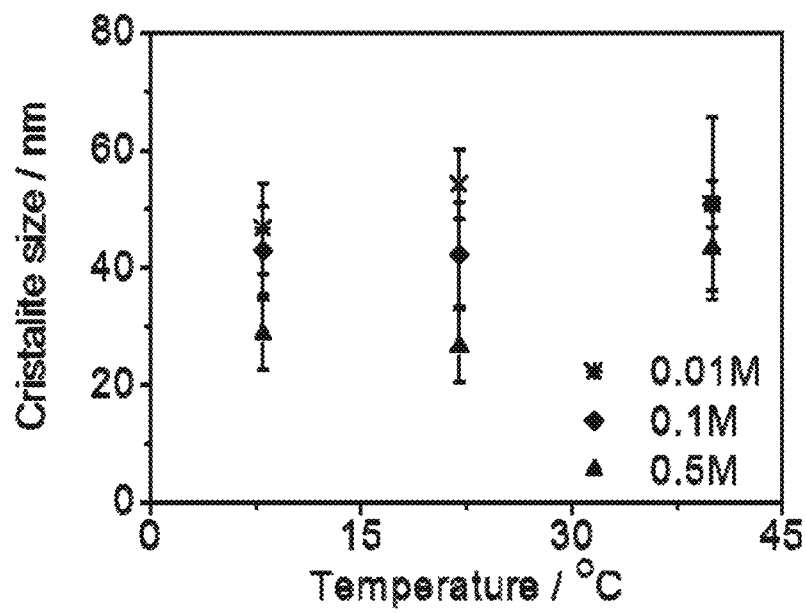
FIG. 20 shows the influence of temperature and precipitant concentration on the: a) powder BaSO$_4$ crystallite size precipitated separately from the PPS matrix, b) BaSO$_4$ crystallite size precipitated into the PPS matrix (precipitants: Ba(ClO$_4$)$_2$ and H$_2$SO$_4$ solutions).
Figure 20:
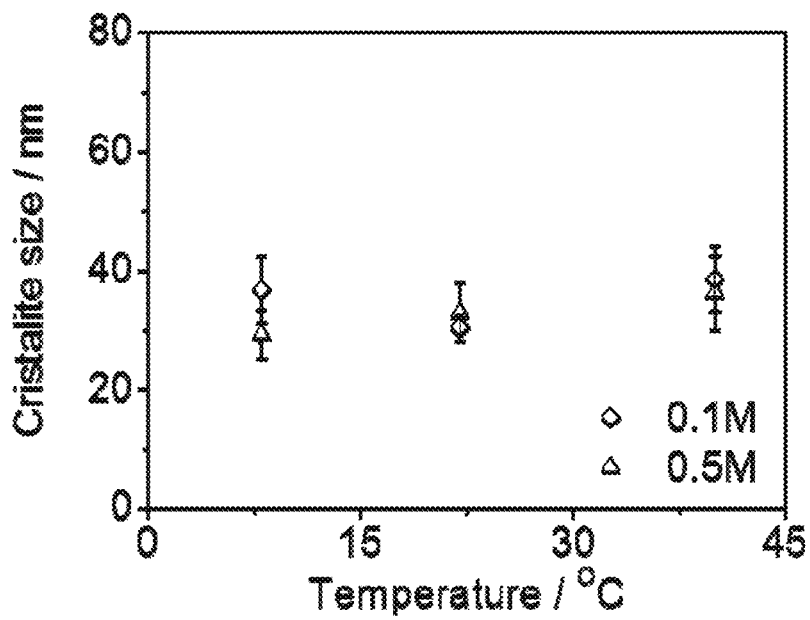

Minimal crystallite size (about 25 nm) was obtained when precipitant concentrations of 0.5 M were used. For precipitant concentrations of 0.1 M, a size shift was observed compared to 0.5 M, while the same trend with respect to size was observed at 8 and 22° C., almost independently of the temperature, but this trend significantly increased at 40° C. The same trend was observed for both concentrations, i.e. at 0.1 M and 0.5 M (FIG. 20).

At 0.01 M neither the crystal growth nor the agglomeration of the crystals into the larger particles observed by SEM is impeded by the numerous nucleation sites, in contrast to experiments conducted at higher concentrations. The crystallite size and agglomerated particles can reach larger dimensions when concentrations of 0.01 M precipitants are used, as observed by XRD (FIG. 20) and SEM (FIG. 21), due to the competitiveness of the nucleation process and growth of the BaSO$_4$ nuclei in solution.

Figure 21:
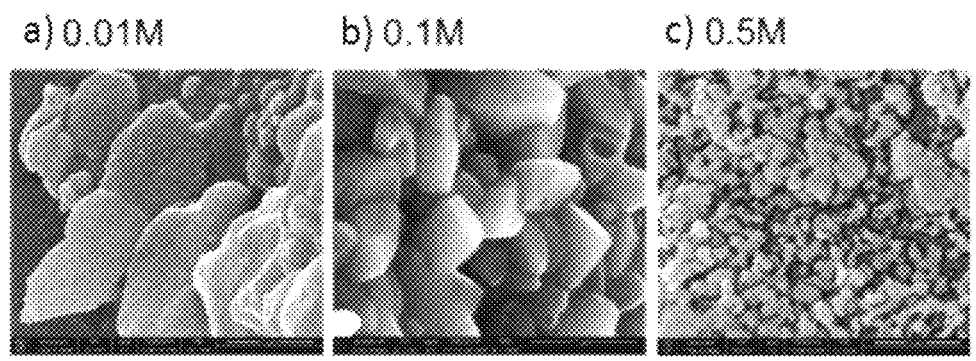
FIG. 21 shows scanning electron microscopy images of the BaSO$_4$ crystallite size precipitated onto a PPS matrix at 22° C. using different precipitants concentration: a) 0.01 M, b) 0.1 M, and c) 0.5 M (precipitants: Ba(ClO$_4$)$_2$ and H$_2$SO$_4$ solutions).

An augmented SEM view of the agglomerates observed for the separator prepared using precipitants concentration of 0.1 M at a precipitation temperature of 22° C., as well as 0.01 M and 0.5 M at 22° C., is given in FIG. 21.

Influence of $Na^+$ Ion ($Na_2SO_4$ as a Precipitant). Precipitaton Duration

Figure 23:
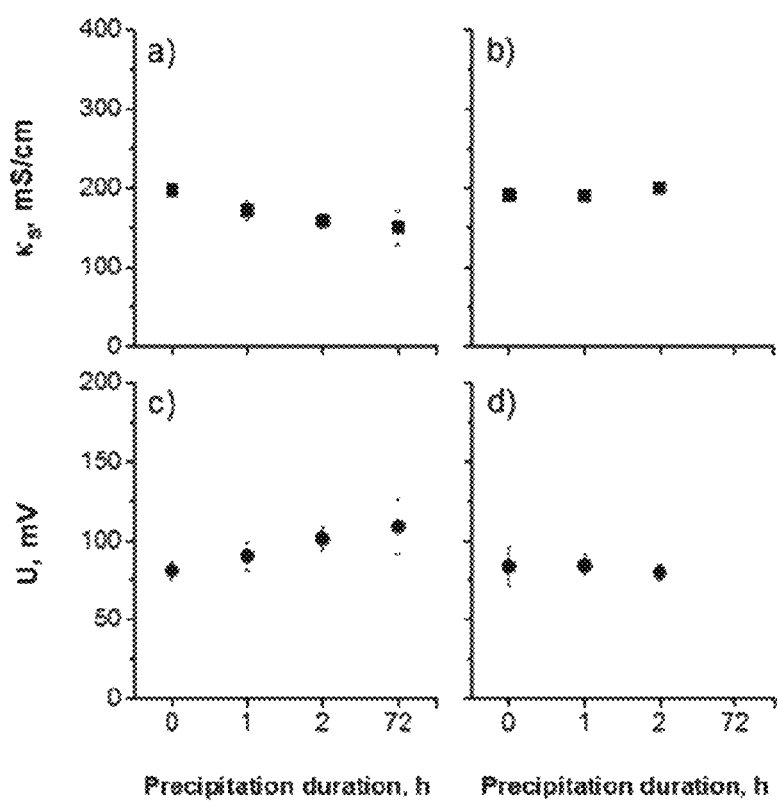
FIG. 23 shows the influence of the sodium ion present during the precipitation process on a)-b) membrane's ionic conductivity, κ, and c)-d) membrane's voltage drop, U, for PPS 1 mm (felt type 306P05 0/0, 400 g/m$^2$, supplied by Heimbach Filtration, no hydrophilic treatment undertaken). a) and c) 8 days immersion in 25 wt. % KOH prior to measurements, degassing in the initial stage of the precipitation process; b) and d) 3 months immersion in 25 wt. % KOH prior to measurements, degassing in the initial stage of the precipitation process

The influence of the $Na^+$ ion on the material properties was checked by replacing $H_2SO_4$ with $Na_2SO_4$ solution during the precipitation process onto the PPS matrix of 1 mm thickness (felt type 306P05 0/0, 400 g/m², supplied by Heimbach Filtration, no hydrophilic treatment undertaken). The values for membrane ionic conductivity, κ, and membrane voltage drop, U, which were obtained for the thus prepared membranes are presented in FIG. 23 depending on the duration of the precipitation process. Corresponding data for ionic conductivity, κ, and membrane voltage drop, U, are given in Table VII and Table VIII, respectively. In both tables, the results obtained with $H_2SO_4$ as a precipitate are given for comparative purposes.

The results obtained after eight days immersion in 25 wt. % KOH, showed that substitution of $H_2SO_4$ with $Na_2SO_4$ led to slightly lower conductivity, while after three months immersion the values obtained with both $H_2SO_4$ and $Na_2SO_4$ were similar. Our hypothesis for the lower conductivity obtained with $Na_2SO_4$ as a precipitant, after eight days immersion, is that the use of $Na_2SO_4$ as a precipitant leads to a more internal deposition of $BaSO_4$ resulting in a higher hydrophobicity. Thus, longer time is needed until the membranes are completely soaked in KOH solution, which was confirmed by the results obtained after three months immersion.

Based on the results (Table VII and Table VIII) and taking into account the high environmental acceptability of $Na_2SO_4$, as well as safety considerations during the preparation, this precipitant would be a choice for the production of membranes on industrial scale.

TABLE VII

Calculated membrane conductivity, κ, for resistance measurements performed at 160 mA/cm² after 8 days and 3 months immersion in 25 wt. % KOH solution for a PPS membrane having a width of 1 mm (felt type 306P05 0/0, 400 g/m², supplied by Heimbach Filtration, no hydrophilic treatment undertaken) which was prepared by precipitation using $H_2SO_4$ or $Na_2SO_4$.

| | κ, mS cm⁻¹ | | | |
|---|---|---|---|---|
| Precipitation | 8 days imm. | | 3 months imm. | |
| duration, h | $H_2SO_4$ | $Na_2SO_4$ | $H_2SO_4$ | $Na_2SO_4$ |
| 1 | 212 ± 7 | 172 ± 12 | 195 ± 8 | 190 ± 3 |
| 2 | 190 ± 9 | 158 ± 9 | 207 ± 4 | 200 ± 5 |
| 72 | 159 ± 5 | 150 ± 22 | 181 ± 16 | |

TABLE VIII

Calculated membrane voltage drop, U, for resistance measurements performed at 160 mA/cm² after 8 days and 3 months immersion in 25 wt. % KOH solution for a PPS membrane having a width of 1 mm (felt type 306P05 0/0, 400 g/m², supplied by Heimbach Filtration, no hydrophilic treatment undertaken) which was prepared by precipitation using $H_2SO_4$ or $Na_2SO_4$.

| | U, mV | | | |
|---|---|---|---|---|
| Precipitation | 8 days imm. | | 3 months imm. | |
| duration, h | $H_2SO_4$ | $Na_2SO_4$ | $H_2SO_4$ | $Na_2SO_4$ |
| 1 | 76 ± 5 | 90 ± 9 | 82 ± 8 | 84 ± 6 |
| 2 | 85 ± 6 | 101 ± 8 | 77 ± 8 | 80 ± 5 |
| 72 | 101 ± 6 | 109 ± 18 | 89 ± 10 | |

Regarding precipitation duration, the results after three months show that for both $H_2SO_4$ and $Na_2SO_4$ significantly higher conductivities are observed after 2 hours of precipitation (Table VII).

Subsequent Precipitation Process

In addition to substituting $H_2SO_4$ with $Na_2SO_4$, the possibility of substituting the second precipitant $Ba(ClO_4)_2$ with $BaCl_2$ has been investigated. Instead of the vertical precipitation process, which is depicted in FIG. 2, the "subsequent precipitation" process has been used. It refers to a process where the matrix material is exposed to the first solution (Ba salt) for 1 h, followed by a presence or an absence of a 2 h drying step and subsequently exposing to the second solution ($H_2SO_4$ or $Na_2SO_4$) for 1 h. Data on the calculated conductivity and voltage drop are given in Tables IX and X, respectively.

TABLE IX

Calculated membrane conductivity, κ, for resistance measurements performed at 160 mA/cm² after 8 days of immersion in 25 wt. % KOH solution for a PPS membrane sample having a width of 1 mm (felt type 306P05 0/0, 400 g/m², supplied by Heimbach Filtration, no hydrophilic treatment undertaken), which was prepared by a subsequent precipitation process (1 h + 1 h immersion in precipitant solutions) with or without a drying step (2 h) in-between immersion steps, using $Ba(ClO_4)_2$ or $BaCl_2$, followed by $H_2SO_4$ or $Na_2SO_4$.

| | κ, mS cm⁻¹ | |
|---|---|---|
| Solutions | with drying step | without drying step |
| $Ba(ClO_4)_2$ + $H_2SO_4$ | 180 ± 12 | 27 ± 2 |
| $Ba(ClO_4)_2$ + $Na_2SO_4$ | 173 ± 5 | |
| $BaCl_2$ + $Na_2SO_4$ | 180 ± 12 | 60 ± 8 |

TABLE X

Calculated membrane voltage drop, U, for resistance measurements performed at 160 mA/cm² after 8 days of immersion in 25 wt. % KOH solution for the PPS membrane samples having a width of 1 mm (felt type 306P05 0/0, 400 g/m², supplied by Heimbach Filtration, no hydrophilic treatment undertaken) which were prepared by a subsequent precipitation process (1 h + 1 h immersion in precipitant solutions) with or without drying step (2 h) between the immersion steps, using $Ba(ClO_4)_2$ or $BaCl_2$, followed by $H_2SO_4$ or $Na_2SO_4$.

| | U, mV | |
|---|---|---|
| Solutions | with drying step | without drying step |
| $Ba(ClO_4)_2$ + $H_2SO_4$ | 89 ± 11 | 598 ± 97 |
| $Ba(ClO_4)_2$ + $Na_2SO_4$ | 93 ± 9 | |
| $BaCl_2$ + $Na_2SO_4$ | 89 ± 11 | 270 ± 43 |

Use of Polypropylene (PP) as Matrix Material

Resistance measurements were also carried out on membranes prepared by a precipitation process (FIG. 2) on a polypropylene matrix (1.6 mm thickness, polypropylene needle felt 851914-000-5/5, no hydrophilicity treatment undertaken). The precipitation process lasted 1 h and the used solutions were $Ba(ClO_4)_2$ and $H_2SO_4$. Before the measurements, the membranes were immersed in 25 wt. % KOH for 12 days. Data on the calculated ionic conductivity and membrane voltage drop are given in Table XI.

TABLE XI

Calculated membrane conductivity, κ, for resistance measurements performed at 160 mA/cm² after 12 days of immersion in 25 wt. % KOH solution for polypropylene samples having a width of 1.6 mm (felt type 851914-000-5/5, supplied by Heimbach Filtration, no hydrophilic treatment undertaken), not precipitated and precipitated using Ba(ClO$_4$)$_2$ and H$_2$SO$_4$ in a 1 h precipitation process.

| Solutions | κ, mS cm$^{-1}$ | U, mV |
|---|---|---|
| No precipitation, pure PP | 161 ± 2 | 159 ± 25 |
| Ba(ClO$_4$)$_2$ + H$_2$SO$_4$ | 176 ± 24 | 148 ± 28 |

The precipitation process leads to a conductivity increase thereby resulting in a voltage drop decrease via the polypropylene membrane (Table XI), which is beneficial for the energy consumption reduction when these membrane are used in alkaline electrolysers or in other energy conversion systems.

The invention claimed is:

1. A woven or nonwoven web comprising:
   a plurality of fibers providing a fiber matrix, the plurality of fibers comprising one or more polymers selected from the group consisting of polyarylene sulfides, polyolefins, polyamide imides, polysulfones, polyethersulfones, polyetherketones, polyether etherketones or copolymers thereof; and
   one or more inorganic salts comprising barium sulfate;
   wherein the one or more inorganic salts are generated by precipitation such that the one or more inorganic salts are precipitation deposited on an outer surface of at least part of the plurality of fibers;
   wherein the one or more inorganic salts at least partially fill a pore dimension of the fiber matrix to provide an oxygen gas tightness of at least about 90% greater compared to the fiber matrix without the inorganic salts being precipitation deposited; and
   wherein the barium sulfate comprises crystallites having a median particle size ($d_{50}$) of size of from about 0.02 µm to about 5 µm.

2. The woven or nonwoven web according to claim 1, wherein the polymer comprises polyarylene sulfide.

3. The woven or nonwoven web according to claim 1, wherein the polymer comprises polyphenylene sulfide.

4. The woven or nonwoven web according to claim 1, wherein the average fiber diameter is from about 0.01 µm to about 20 µm.

5. The woven or nonwoven web according to claim 1, wherein the average fiber length is from about 0.01 µm to about 500 µm.

6. The woven or nonwoven web according to claim 1, wherein the woven or nonwoven web comprises the one or more inorganic salts in an amount of about 0.01 wt-% to about 70 wt-% based on the total weight of the woven or non-woven web.

7. The woven or nonwoven web according to claim 1, wherein the web is a woven web.

8. The woven or nonwoven web according to claim 1, wherein the web is a nonwoven web.

9. The woven or nonwoven web according to claim 1 used as a diaphragm or membrane in an alkaline electrolyzer.

10. The woven or nonwoven web used as a diaphragm or membrane in an alkaline electrolyzer according to claim 8, wherein a hydrogen concentration on an oxygen side of an alkaline water electrolysis cell being below about 0.01%.

11. A method for preparing a woven or nonwoven web comprising the steps of:

(i) providing a raw woven or nonwoven web, wherein the raw woven or nonwoven web has a first and a second major surface and wherein the raw woven or nonwoven web comprises a plurality of fibers providing a fiber matrix, the plurality of fibers comprising one or more polymers selected from the group consisting of polyarylene sulfides, polyolefins, polyamide imides, polysulfones, polyethersulfones, polyetherketones, polyether etherketones or copolymers thereof;
    (ii) contacting at least part of the raw woven or nonwoven web with a first solution of a salt barium, strontium, calcium, lead or a mixture thereof;
    (iii) contacting at least part of the raw woven or nonwoven web with a second solution of a sulfate salt, sulfuric acid or a mixture thereof or with a gas or gas mixture comprising sulfur trioxide; and
    (iv) precipitation depositing one or more inorganic salts comprising barium sulfate on the outer surface of at least part of the plurality of fibers by allowing the first solution and the second solution or the gas or gas mixture to come into contact, so that one or more inorganic salts are formed, wherein the barium sulfate comprising crystallites having a median particle size ($d_{50}$) of size of from about 0.02 µm to about 5 µm, and wherein the one or more inorganic salts at least partially fill a pore dimension of the fiber matrix to provide a woven or nonwoven web,
    wherein the woven or nonwoven web has an oxygen gas tightness of at least about 90% greater compared to the fiber matrix without the inorganic salts being precipitation deposited.

12. The method for preparing the woven or nonwoven web according to claim 11, wherein the step of contacting at least part of the raw woven or nonwoven web with the first solution comprises
    contacting at least part of the first major surface of the raw woven or nonwoven web with the first solution; and
    wherein the step of contacting at least part of the raw woven or nonwoven web with the second solution comprises
    contacting at least part of the second major surface of the raw woven or nonwoven web with the second solution or with the gas or gas mixture.

13. The method for preparing the woven or nonwoven web according to claim 11, wherein the step of contacting at least part of the raw woven or nonwoven web with the first solution comprises
    contacting at least part of the first major surface and at least part of the second major surface of the raw woven or nonwoven web with the first solution; and wherein the step of contacting at least part of the raw woven or nonwoven web with the second solution comprises
    contacting at least part of the first major surface and at least part of the second major surface of the raw woven or nonwoven web with the second solution or with the gas or gas mixture.

14. The method according to claim 11, wherein the first solution comprises a perchlorate or chloride salt of barium or a mixture of these salts.

15. The method according to claim 11, wherein the second solution comprises a sulfate salt, sulfuric acid or a mixture thereof.

16. The method according to claim 11, wherein one or more of the steps are conducted at a temperature within the range from about 0° C. to about 200° C.

17. The method according to claim 11, wherein steps ii) and iii) are conducted simultaneously.

18. The method according to claim 11, wherein steps ii) and iii) are conducted sequentially.

19. The method according to claim 11, wherein the first solution comprises barium chloride, and the second solution comprises sodium sulfate, and wherein the raw woven or nonwoven web comprises a plurality of fibers comprising one or more polymers selected from the group consisting of polyphenylene sulfides and polypropylene.

20. An electrolytic cell for conducting alkaline water electrolysis comprising a woven or nonwoven web comprising:
   a plurality of fibers providing a fiber matrix, the plurality of fibers comprising one or more polymers selected from the group consisting of polyarylene sulfides, polyolefins, polyamide imides, polysulfones, polyethersulfones, polyetherketones, polyether etherketones or copolymers thereof; and
   one or more inorganic salts comprising barium sulfate;
   wherein the one or more inorganic salts are generated by precipitation such that the one or more inorganic salts are precipitation deposited on an outer surface of at least part of the plurality of fibers;
   wherein the one or more inorganic salts at least partially fill a pore dimension of the fiber matrix to provide an oxygen gas tightness of at least about 90% greater compared to the fiber matrix without the inorganic salts being precipitation deposited; and
   wherein the barium sulfate comprises crystallites having a median particle size ($d_{50}$) of size of from about 0.02 μm to about 5 μm.

21. A method of conducting alkaline water electrolysis, wherein a woven or nonwoven web contacts water or steam, wherein the woven or nonwoven web comprises:
   a plurality of fibers providing a fiber matrix, the plurality of fibers comprising one or more polymers selected from the group consisting of polyarylene sulfides, polyolefins, polyamide imides, polysulfones, polyethersulfones, polyetherketones, polyether etherketones or copolymers thereof; and
   one or more inorganic salts comprising barium sulfate;
   wherein the one or more inorganic salts are generated by precipitation such that the one or more inorganic salts are precipitation deposited on an outer surface of at least part of the plurality of fibers;
   wherein the one or more inorganic salts at least partially fill a pore dimension of the fiber matrix to provide an oxygen gas tightness of at least about 90% greater compared to the fiber matrix without the inorganic salts being precipitation deposited; and
   wherein the barium sulfate comprises crystallites having a median particle size ($d_{50}$) of size of from about 0.02 μm to about 5 μm.

22. The method according to claim 21, wherein the woven or nonwoven web contacts the water or steam at an elevated temperature to diminish electrical energy demand or ohmic losses.

* * * * *